(12) United States Patent
Zhang et al.

(10) Patent No.: US 12,382,508 B2
(45) Date of Patent: Aug. 5, 2025

(54) PRIORITY BASED CONFLICT RESOLUTION IN FULL-DUPLEX OPERATIONS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Jelena Damnjanovic, Del Mar, CA (US); Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 17/831,042

(22) Filed: Jun. 2, 2022

(65) Prior Publication Data

US 2023/0397262 A1    Dec. 7, 2023

(51) Int. Cl.
*H04W 74/08* (2024.01)
*H04L 5/14* (2006.01)
(Continued)

(52) U.S. Cl.
CPC ........... *H04W 74/0841* (2013.01); *H04L 5/14* (2013.01); *H04W 72/54* (2023.01); *H04W 72/569* (2023.01); *H04W 74/0866* (2013.01)

(58) Field of Classification Search
CPC ..... H04B 7/0621; H04L 5/001; H04L 5/0026; H04L 5/0048; H04L 5/0064;
(Continued)

(56) References Cited

U.S. PATENT DOCUMENTS

| | | | |
|---|---|---|---|
| 11,546,043 B2* | 1/2023 | Zhou | H04L 5/0044 |
| 2019/0149365 A1* | 5/2019 | Chatterjee | H04W 76/11 |
| | | | 370/329 |

(Continued)

FOREIGN PATENT DOCUMENTS

| | | |
|---|---|---|
| WO | WO-2021159065 A1 | 8/2021 |
| WO | WO-2023009266 A1 | 2/2023 |

OTHER PUBLICATIONS

International Search Report and Written Opinion—PCT/US2023/022873—ISA/EPO—Aug. 18, 2023 (2203135WO).

*Primary Examiner* — Wutchung Chu
(74) *Attorney, Agent, or Firm* — Holland & Hart LLP

(57) ABSTRACT

Methods, systems, and devices for wireless communications are described. Some wireless communications systems may support priority based conflict resolution in full-duplex operations. In some cases, a wireless device may communicate one or more control messages scheduling a first message associated with a first transmission configuration indicator (TCI) state and scheduling a second message associated with a second TCI state, where at least a portion of the first message overlaps in time with the second message. In some cases, the wireless device may perform a conflict resolution procedure for the first message and the second message based on the first message at least partially overlapping in time with the second message and a conflict between the first TCI state and the second TCI state. Additionally, the wireless device may communicate at least the first message based on the conflict resolution procedure.

27 Claims, 12 Drawing Sheets

(51) Int. Cl.
*H04W 72/54* (2023.01)
*H04W 72/566* (2023.01)
*H04W 74/0833* (2024.01)

(58) Field of Classification Search
CPC ....... H04L 5/0092; H04L 5/14; H04L 5/1461; H04L 5/1469; H04W 72/0446; H04W 72/54; H04W 72/569; H04W 74/0841; H04W 74/0866; H04W 72/1268; H04W 72/21; H04W 72/1273; H04W 72/20; H04W 72/232; H04W 72/0453; H04W 72/56; H04W 72/566; H04W 72/044; H04W 72/1263; H04W 72/51; H04W 72/046; H04W 72/535; H04W 72/231; H04W 72/04; H04W 72/0473; H04W 72/12; H04W 74/0816; H04W 74/0808; H04W 74/006; H04W 4/70
See application file for complete search history.

(56) References Cited

U.S. PATENT DOCUMENTS

| | | | |
|---|---|---|---|
| 2020/0028640 A1* | 1/2020 | Yeo | H04L 5/0007 |
| 2020/0120678 A1* | 4/2020 | Zhou | H04L 5/0092 |
| 2020/0351892 A1* | 11/2020 | Yi | H04L 5/0092 |
| 2021/0051667 A1 | 2/2021 | Yang et al. | |
| 2021/0184812 A1* | 6/2021 | MolavianJazi | H04L 1/0045 |
| 2021/0235457 A1* | 7/2021 | Abedini | H04B 7/0617 |
| 2022/0086658 A1* | 3/2022 | Zhang | H04L 5/0051 |
| 2022/0104245 A1* | 3/2022 | Xu | H04L 5/0053 |
| 2022/0109553 A1* | 4/2022 | Bai | H04L 5/0092 |
| 2022/0110146 A1 | 4/2022 | Xu et al. | |
| 2022/0124551 A1* | 4/2022 | Lu | H04W 72/569 |
| 2022/0182110 A1* | 6/2022 | Zhang | H04W 74/0833 |
| 2022/0210777 A1* | 6/2022 | Li | H04W 72/044 |
| 2022/0248476 A1* | 8/2022 | Taherzadeh Boroujeni | H04L 1/1819 |
| 2022/0264595 A1* | 8/2022 | Xiao | H04W 72/569 |
| 2022/0287013 A1* | 9/2022 | Farag | H04L 5/0035 |
| 2022/0295479 A1* | 9/2022 | Behravan | H04W 72/20 |
| 2022/0330266 A1* | 10/2022 | Huang | H04W 28/0268 |
| 2022/0337378 A1* | 10/2022 | Zhang | H04W 72/569 |
| 2022/0353026 A1* | 11/2022 | Yeo | H04L 5/0007 |
| 2022/0353899 A1* | 11/2022 | Xiao | H04L 1/188 |
| 2022/0386355 A1* | 12/2022 | Yi | H04W 72/569 |
| 2022/0394707 A1* | 12/2022 | Chen | H04L 1/1854 |
| 2023/0015859 A1* | 1/2023 | Tseng | H04W 74/0875 |
| 2023/0028119 A1* | 1/2023 | Gao | H04L 5/001 |
| 2023/0058734 A1* | 2/2023 | Xiao | H04L 1/1812 |
| 2023/0102738 A1* | 3/2023 | Zhao | H04L 5/1469 |
| 2023/0208597 A1* | 6/2023 | Yao | H04B 7/0695 370/329 |
| 2023/0217442 A1* | 7/2023 | Jang | H04W 72/20 |
| 2023/0254854 A1* | 8/2023 | Cirik | H04W 72/1268 370/336 |
| 2023/0269041 A1* | 8/2023 | Rong | H04L 5/0053 370/329 |
| 2023/0318795 A1* | 10/2023 | Xu | H04L 5/0094 370/329 |
| 2023/0362917 A1* | 11/2023 | Zhang | H04W 72/563 |
| 2024/0080847 A1* | 3/2024 | Li | H04L 1/1861 |
| 2024/0172229 A1* | 5/2024 | Gao | H04L 1/1812 |
| 2024/0224271 A1* | 7/2024 | Xiong | H04W 56/0015 |
| 2024/0313907 A1* | 9/2024 | Lee | H04L 1/1671 |
| 2024/0340860 A1* | 10/2024 | Wang | H04W 72/0446 |
| 2024/0373420 A1* | 11/2024 | Ouchi | H04L 5/0012 |
| 2024/0405814 A1* | 12/2024 | Jang | H04L 5/0023 |
| 2024/0405951 A1* | 12/2024 | Ying | H04L 5/0055 |
| 2025/0023697 A1* | 1/2025 | Lee | H04W 72/11 |
| 2025/0047454 A1* | 2/2025 | Jung | H04L 5/0094 |
| 2025/0048359 A1* | 2/2025 | Zhang | H04W 72/0446 |
| 2025/0081209 A1* | 3/2025 | Shao | H04W 72/1268 |
| 2025/0089027 A1* | 3/2025 | Okamura | H04W 72/569 |

* cited by examiner

Control Message 305

Downlink Message 310

Uplink Message 315

PRIORITY BASED CONFLICT RESOLUTION IN FULL-DUPLEX OPERATIONS

FIELD OF TECHNOLOGY

The following relates to wireless communications, including priority based conflict resolution in full-duplex operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support priority based conflict resolution in full-duplex operations. Generally, the techniques described herein enable a wireless device, such as a user equipment (UE) or network entity, operating in a full-duplex mode, to perform a conflict resolution procedure based on a first transmission configuration indicator (TCI) state and a second TCI state when messages associated with the first and second TCIs overlap, at least partially, in time and based on a conflict between the first TCI state and the second TCI state. For example, the wireless device may communicate (e.g., transmit if the wireless device is a network entity, receive if the wireless device is a UE) one or more control messages scheduling a first message associated with a first TCI state and a second message associated with a second TCI state, where at least a portion of the first message overlaps in time with the second message. In some cases, there may be a conflict between the first TCI state and the second TCI state, such that the wireless device performs a conflict resolution procedure for the first message and the second message based on the first message at least partially overlapping with the second message and the conflict. For example, a conflict may exist between the first TCI state and the second TCI state such that a first beam associated with the first TCI state may cause interference with a second beam associated with the second TCI state. In such cases, a UE may be unable to receive or decode a message transmitted on the second beam due to the interference from the first beam.

In some cases, the wireless device may perform the conflict resolution procedure based on a comparison between a first priority value associated with the first message and a second priority value associated with the second message. For example, the wireless device may drop all or a portion of a message associated with the lower priority value. In another example, the wireless device may change the TCI state that the message with the lower priority value is transmitted according to. Additionally, or alternatively, the wireless device may perform the conflict resolution procedure based on a feedback message communicated (e.g., transmitted) by the wireless device. For example, the wireless device may transmit a feedback message indicating the conflict resolution procedure. That is, the feedback message may indicate part or all of the first message or second message to drop or a TCI state change for the first message or second message.

A method for wireless communications at a wireless device is described. The method may include communicating one or more control messages scheduling a first message associated with a first TCI state and scheduling a second message associated with a second TCI state, where at least a portion of the first message overlaps in time with the second message, performing a conflict resolution procedure for the first message and the second message based on the first message at least partially overlapping in time with the second message and a conflict between the first TCI state and the second TCI state, and communicating at least the first message based on the conflict resolution procedure.

An apparatus for wireless communications at a wireless device is described. The apparatus may include a processor, memory coupled with the processor, and instructions stored in the memory. The instructions may be executable by the processor to cause the apparatus to communicate one or more control messages scheduling a first message associated with a first TCI state and scheduling a second message associated with a second TCI state, where at least a portion of the first message overlaps in time with the second message, perform a conflict resolution procedure for the first message and the second message based on the first message at least partially overlapping in time with the second message and a conflict between the first TCI state and the second TCI state, and communicate at least the first message based on the conflict resolution procedure.

Another apparatus for wireless communications at a wireless device is described. The apparatus may include means for communicating one or more control messages scheduling a first message associated with a first TCI state and scheduling a second message associated with a second TCI state, where at least a portion of the first message overlaps in time with the second message, means for performing a conflict resolution procedure for the first message and the second message based on the first message at least partially overlapping in time with the second message and a conflict between the first TCI state and the second TCI state, and means for communicating at least the first message based on the conflict resolution procedure.

A non-transitory computer-readable medium storing code for wireless communications at a wireless device is described. The code may include instructions executable by a processor to communicate one or more control messages scheduling a first message associated with a first TCI state and scheduling a second message associated with a second TCI state, where at least a portion of the first message overlaps in time with the second message, perform a conflict resolution procedure for the first message and the second message based on the first message at least partially overlapping in time with the second message and a conflict between the first TCI state and the second TCI state, and communicate at least the first message based on the conflict resolution procedure.

In some examples of the method, apparatuses, and non-transitory computer-readable medium described herein, performing the conflict resolution procedure may include operations, features, means, or instructions for performing the conflict resolution procedure based on a comparison between a first priority value associated with the first message and a second priority value associated with the second message.

In some examples of the method, apparatuses, and non-transitory computer-readable medium described herein, communicating at least the first message may include operations, features, means, or instructions for transmitting the first message according to the first TCI state.

In some examples of the method, apparatuses, and non-transitory computer-readable medium described herein, communicating at least the first message may include operations, features, means, or instructions for refraining from receiving the second message based on the first priority value being greater than the second priority value.

In some examples of the method, apparatuses, and non-transitory computer-readable medium described herein, communicating at least the first message may include operations, features, means, or instructions for receiving the first message according to the first TCI state.

In some examples of the method, apparatuses, and non-transitory computer-readable medium described herein, communicating at least the first message may include operations, features, means, or instructions for refraining from transmitting the second message based on the first priority value being greater than the second priority value.

In some examples of the method, apparatuses, and non-transitory computer-readable medium described herein, the first priority value may be greater than the second priority value, and communicating at least the first message may include operations, features, means, or instructions for communicating the first message according to the first TCI state and communicating a portion of the second message according to the second TCI state.

In some examples of the method, apparatuses, and non-transitory computer-readable medium described herein, communicating the first message according to the first TCI state may include operations, features, means, or instructions for transmitting the first message according to the first TCI state.

In some examples of the method, apparatuses, and non-transitory computer-readable medium described herein, communicating the portion of the second message according to the second TCI state may include operations, features, means, or instructions for receiving the portion of the second message according to the second TCI state.

In some examples of the method, apparatuses, and non-transitory computer-readable medium described herein, communicating the first message according to the first TCI state may include operations, features, means, or instructions for receiving the first message according to the first TCI state.

In some examples of the method, apparatuses, and non-transitory computer-readable medium described herein, communicating the portion of the second message according to the second TCI state may include operations, features, means, or instructions for transmitting the portion of the second message according to the second TCI state.

In some examples of the method, apparatuses, and non-transitory computer-readable medium described herein, the first priority value may be greater than the second priority value, and communicating at least the first message may include operations, features, means, or instructions for communicating the first message according to the first TCI state and communicating the second message according to a third TCI state different from the second TCI state.

In some examples of the method, apparatuses, and non-transitory computer-readable medium described herein, communicating the first message according to the first TCI state and communicating the second message according to the third TCI state may include operations, features, means, or instructions for transmitting the first message according to the first TCI state and receiving the second message according to the third TCI state based on the first priority value being greater than the second priority value.

In some examples of the method, apparatuses, and non-transitory computer-readable medium described herein, communicating the first message according to the first TCI state and communicating the second message according to the third TCI state may include operations, features, means, or instructions for receiving the first message according to the first TCI state and transmitting the second message according to the third TCI state based on the first priority value being greater than the second priority value.

Some examples of the method, apparatuses, and non-transitory computer-readable medium described herein may further include operations, features, means, or instructions for selecting the third TCI state based on a first TCI state pair from a set of TCI state pairs, where the first TCI state pair includes the first TCI state and the third TCI state.

Some examples of the method, apparatuses, and non-transitory computer-readable medium described herein may further include operations, features, means, or instructions for performing one or more measurements of one or more pairs of TCI states, where the set of TCI state pairs may be based on performing the one or more measurements.

Some examples of the method, apparatuses, and non-transitory computer-readable medium described herein may further include operations, features, means, or instructions for communicating an indication of the set of TCI state pairs.

In some examples of the method, apparatuses, and non-transitory computer-readable medium described herein, the set of TCI state pairs may be based on one or more parameters at the wireless device.

In some examples of the method, apparatuses, and non-transitory computer-readable medium described herein, self-interference between the first TCI state and the third TCI state, may be less than or equal to a threshold.

Some examples of the method, apparatuses, and non-transitory computer-readable medium described herein may further include operations, features, means, or instructions for communicating a feedback message indicating the conflict resolution procedure, where performing the conflict resolution procedure may be based on the feedback message.

In some examples of the method, apparatuses, and non-transitory computer-readable medium described herein, communicating at least the first message may include operations, features, means, or instructions for communicating the first message according to the first TCI state based on the feedback message.

In some examples of the method, apparatuses, and non-transitory computer-readable medium described herein, communicating at least the first message may include operations, features, means, or instructions for refraining from communicating the second message based on the feedback message.

In some examples of the method, apparatuses, and non-transitory computer-readable medium described herein, communicating at least the first message may include operations, features, means, or instructions for communicating the first message according to the first TCI state and communicating a portion of the second message according to the second TCI state.

In some examples of the method, apparatuses, and non-transitory computer-readable medium described herein, communicating at least the first message may include operations, features, means, or instructions for communicating the first message according to the first TCI state and communicating the second message according to a third TCI state different from the second TCI state.

Some examples of the method, apparatuses, and non-transitory computer-readable medium described herein may further include operations, features, means, or instructions for measuring self-interference between the first message associated with the first TCI state and the second message associated with a second TCI state, where the conflict may be based on the self-interference for full-duplex operation being greater than a threshold.

In some examples of the method, apparatuses, and non-transitory computer-readable medium described herein, the wireless device may be a UE, and communicating the one or more control messages may include operations, features, means, or instructions for receiving the one or more control messages scheduling the first message associated with the first TCI state and scheduling the second message associated with the second TCI state.

In some examples of the method, apparatuses, and non-transitory computer-readable medium described herein, the wireless device may be a network entity, and communicating the one or more control messages may include operations, features, means, or instructions for transmitting the one or more control messages scheduling the first message associated with the first TCI state and scheduling the second message associated with the second TCI state.

DETAILED DESCRIPTION

Figure 1:
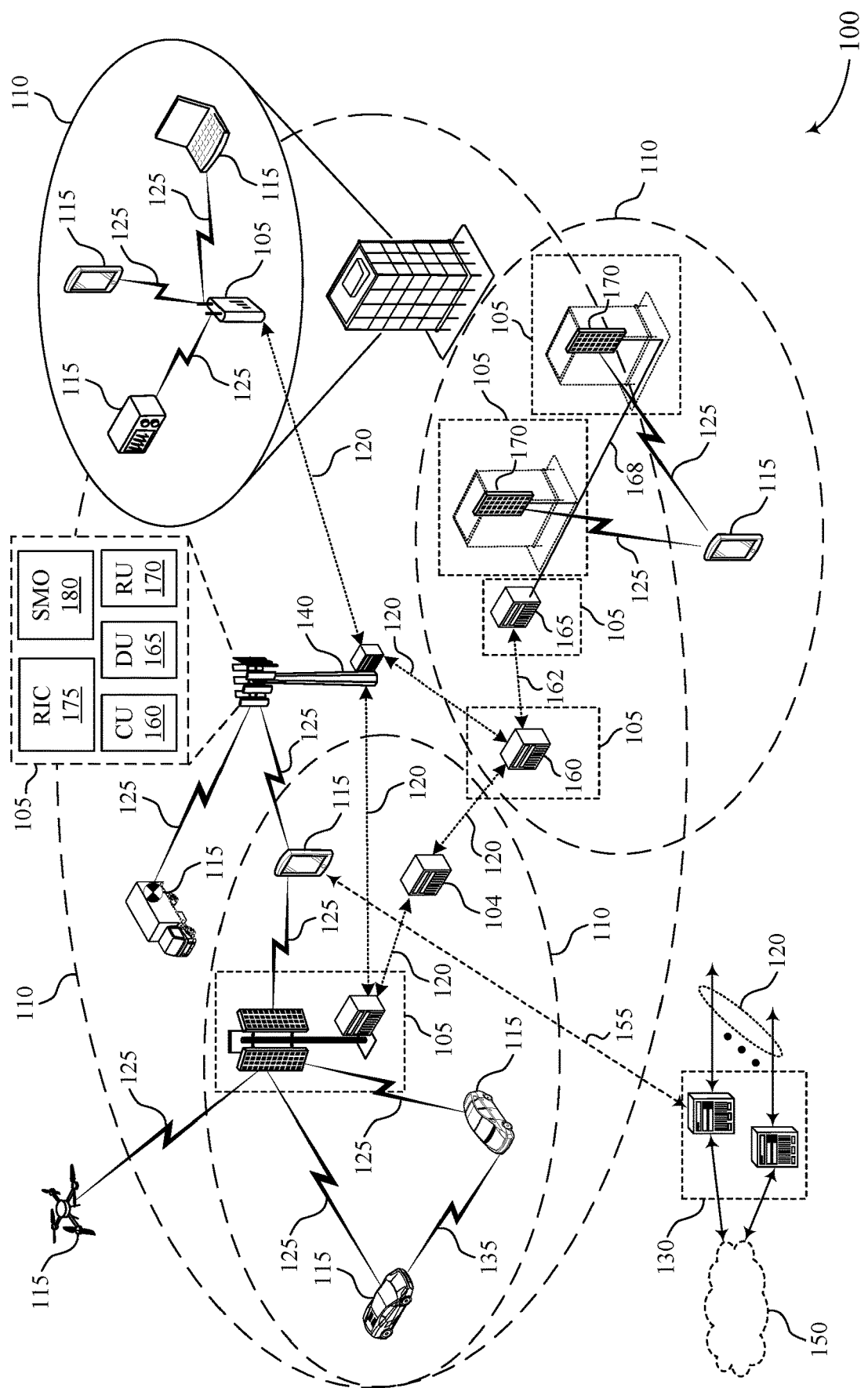
FIG. 1 illustrates an example of a wireless communications system that supports priority based conflict resolution in full-duplex operations in accordance with one or more aspects of the present disclosure.

In some wireless communications systems, a wireless device, such as a user equipment (UE) or a network entity, may support full-duplex operations. In such cases, the wireless device may operate in a full-duplex mode in which the wireless device may simultaneously transmit and receive communications during a time period. That is, communications received by the wireless device may overlap, at least partially, in the time domain with communications transmitted by the wireless device. In some cases, wireless devices may experience self-interference due to multiple communications from the wireless device at least partially overlapping in time. For example, a conflict may exist between a first beam and a second beam such that a communication received by the wireless device via the first beam may cause self-interference with a communication transmitted by the wireless device via the second beam. In such cases, the wireless device may experience poor communication performance, failed transmissions, or the like thereof.

The techniques described herein may for a wireless device to perform a conflict resolution procedure while operating in a full-duplex mode. In some cases, a wireless device, such as a UE or a network entity, may communicate one or more control messages scheduling a first message via a first beam (e.g., associated with a first transmission configuration indicator (TCI) state) and a second message via a second beam (e.g., associated with a second TCI state), where at least a portion of the first message overlaps in time with the second message. Additionally, a conflict may exist between the first beam and the second beam such that the wireless device may be unable to perform full-duplex communications (e.g., the wireless device may be unable to communicate the first message and the same message simultaneously) For example, self-interference between the first beam and the second beam may exceed a threshold value, such that the wireless device may be unable to communicate simultaneously via the first beam, the second beam, or both, due to the self-interference. In such cases, the wireless device may perform a conflict resolution procedure for the first message and the second message based on the first message at least partially overlapping in time with the second message and the conflict between the first beam and the second beam.

In some cases, the wireless device may perform the conflict resolution procedure by dropping part or all of the first message or the second message. For example, the wireless device may drop the second message, such that the wireless device communicates the first message and refrains from communicating the second message. In another example, the wireless device may drop a first portion of the second message, where the first portion of the second message overlaps in time with the first message. That is, the wireless device may communicate the first message and communicate a second portion of the second message, where the second portion of the second message does not overlap in time with the first message. In some cases, the wireless device may perform the conflict resolution procedure by changing the beam on which the first message or the second message is communicated (e.g., changing the TCI state associated with the message). For example, the wireless device may transmit the first message via the first beam and may transmit the second message via a third beam, where the self-interference between the first beam and the third beam is below the threshold.

In some cases, the wireless device may perform the conflict resolution procedure based on priority values associated with the messages. For example, the first message may be associated with a first priority value and the second message may be associated with a second priority value. In such cases, the wireless device may drop part or all of the message associated with the lower priority value or may change the beam in which the message associated with the lower priority value is communicated. In some other cases, the wireless device may perform the conflict resolution procedure based on a feedback message transmitted by the wireless device, where the feedback message indicates a conflict resolution procedure to perform.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to priority based conflict resolution in full-duplex operations.

FIG. 1 illustrates an example of a wireless communications system 100 that supports priority based conflict resolution in full-duplex operations in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180), or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., TAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the TAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support priority based conflict resolution in full-duplex operations as described herein. For example, some operations described as being performed by a UE 115 or a network entity 105 (e.g., a base station 140) may additionally, or alternatively, be performed by one or more components of the disaggregated RAN architecture (e.g., TAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 200 may support priority based conflict resolution in full-duplex operations. In some cases, a wireless device, such as a UE 115 or a network entity 105, may communicate (e.g., receive or transmit) one or more control messages scheduling a first message associated with a first TCI state (e.g., on a first beam) and a second message associated with a second TCI state (e.g., on a second beam), where the first message at least partially overlaps in time with the second message. In some cases, the wireless device may perform a conflict resolution procedure for the first message and the second message based on the first message at least partially overlapping in time with the second message and a conflict between the first TCI state and the second TCI state. The conflict between the first TCI state and the second TCI state may be associated with self-interference between the first TCI state and the second TCI state exceeding a threshold value.

In some cases, the wireless device may perform the conflict resolution procedure based on a comparison of priority values associated with each message. For example, the wireless device may drop part or all of a message associated with the lower priority value. In other words, the wireless device may communicate a message associated with a higher priority value and refrain from communicating part or all the message associated with the lower priority value. In another example, the wireless device may change a TCI state for a message associated the lowest priority value. In other words, the wireless device may communicate a message associated with a higher priority value according to a scheduled TCI state associated with the message and may communicate a message associated with the lower priority value according to a selected TCI state, where the selected TCI state is different than the TCI state scheduled for the message associated with the lower priority value.

Additionally, or alternatively, the wireless device may perform the conflict resolution procedure based on a feedback message communicated with another wireless device. That is, the wireless device may communicate a feedback message indicating a suggest conflict resolution procedure, such as dropping a message or changing the TCI state of a message, and may perform the conflict resolution procedure indicated in the feedback message.

Figure 2A:
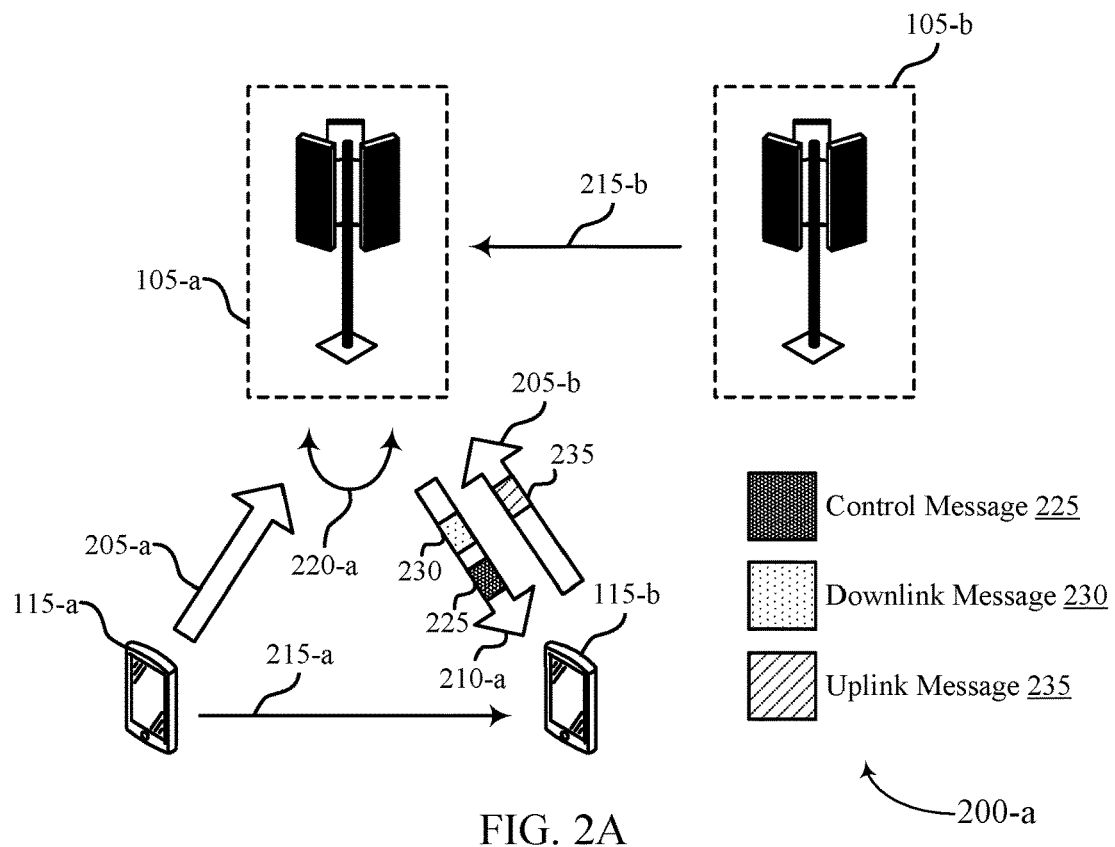
FIGS. 2A, 2B, 3A, and 3B each illustrate an example of a wireless communications system that supports priority based conflict resolution in full-duplex operations in accordance with one or more aspects of the present disclosure.
Figure 2B:
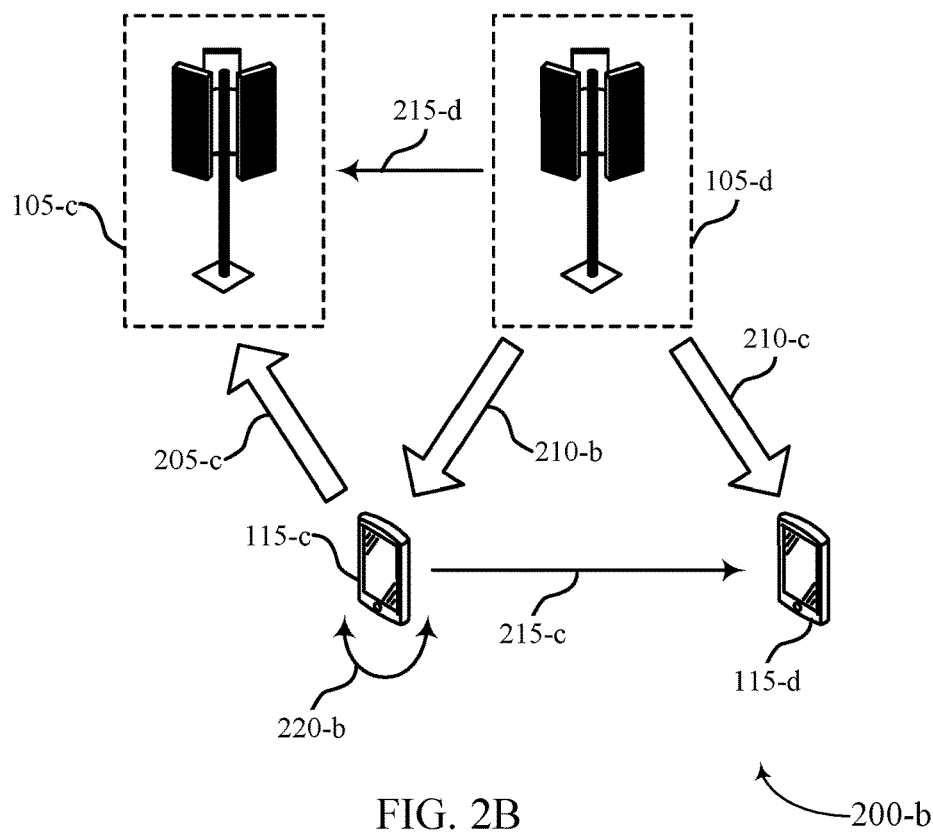

FIGS. 2A and 2B each illustrate an example of a wireless communications system 200 that supports priority based conflict resolution in full-duplex operations in accordance with one or more aspects of the present disclosure. In some examples, the wireless communications systems 200 (e.g., a wireless communications system 200-*a* and a wireless communications system 200-*b*) may implement aspects of the wireless communications system 100. For example, the wireless communications systems 200 may each include one or more network entities 105 (e.g., a network entity 105-*a*, a network entity 105-*b*, a network entity 105-*c*, and a network entity 105-*d*) and one or more UEs 115 (e.g., a UE 115-*a*, a UE 115-*b*, a UE 115-*c*, and a UE 115-*d*), which may be examples of the corresponding devices described with reference to FIG. 1. In the example of FIGS. 2A and 2B, the network entities 105 may be examples of a CU 160, a DU 165, an RU 170, a base station 140, an IAB node 104, or one or more other network nodes as described with reference to FIG. 1. The wireless communications systems 300 may include techniques for a wireless device, operating in a full-duplex mode, to perform a conflict resolution procedure for a first message, such as a downlink message 230, schedule on a first beam (e.g., associated with a first TCI state) and a second message, such as an uplink message 235, scheduled on a second beam (e.g., associated with a second TCI state) based on the downlink message 230 at least partially overlapping in time with the uplink message 235 and a conflict between the first beam and the second beam.

In the examples of FIGS. 2A and 2B, the UEs 115 and the network entities 105 may communicate via one or more communication links 205 (e.g., a communication link 205-*a*, a communication link 205-*b*, and a communication link 205-*c*) and via one or more communication links 210 (e.g., a communication link 210-*a*, a communication link 210-*b*, and a communication link 210-*c*). The communication links 205 may be examples of uplinks and the communication links 210 may be examples of downlinks. Additionally, or alternatively, the communication links 205 and the communication links 210 may each be examples of a communication link 125 as described with reference to FIG. 1. Each wireless communications system 200 may illustrate communication devices (e.g., one or more UEs 115, one or more network entities 105) operating in a full-duplex mode (e.g., performing full-duplex wireless communications) or a half-duplex TDD mode (e.g., performing half-duplex TDD wireless communications). That is, full-duplex (or half-duplex TDD) capabilities may be present at one or more network entities 105, one or more UEs 115 (or both). For example, the wireless communications systems 200 may support TDD radio frequency bands (e.g., radio frequency spectrum bands configured for TDD communications), FDD radio frequency bands (e.g., radio frequency spectrum bands configured for FDD communications), full-duplex communications at one or more network entities 105 (and/or one or more UEs 115), half-duplex communications at one or more UE 115, or any combination thereof.

Each wireless communications system 200 may support multiple types of full-duplex operations. For example, a communication device operating within the wireless communications systems 200 (e.g., a network entity 105, a UE 115) may support in-band full-duplex (IBFD) operations, sub-band FDD (SBFD) operations (e.g., frequency duplex operations), or both. In some examples of IBFD operations, the communication device may transmit (e.g., on a first antenna panel) and receive (e.g., on a second antenna panel) wireless communications on a same time and frequency resource (e.g., a same slot and component carrier bandwidth). For example, downlink communications and uplink communications may share time and frequency resources (e.g., IBFD time and frequency resources). In some examples, the time and frequency resources may partially overlap or fully overlap. Additionally, or alternatively, for SBFD operations, the communications device may transmit and receive communications at over a same time resource and one or more different frequency resources. That is, the downlink resources may be separated from the uplink resource in the frequency domain.

In the example of FIG. 2A, the network entity 105-*a* may support SBFD operations, such that downlink communications transmitted by the network entity 105-*a* (e.g., to the UE 115-*b*) may overlap in time with uplink communications received by the network entity 105-*a* (e.g., from the UE 115-*a*). In some examples, the network entity 105-*a* may configure communications for the UE 115-*a* and the UE 115-*b* according to a resource structure. The resource structure may include time domain resources (e.g., slots, symbols) allocated for downlink data, time domain resources allocated for uplink data, and one or more time domain resources allocated for both downlink data and uplink data.

In some examples, the time domain resources allocated for both downlink data and uplink data may be referred to as D+U slots (or D+U symbols). In some examples, a D+U slot may include half-duplex symbols (e.g., downlink symbols or uplink symbols) or full-duplex symbols (e.g., both downlink symbols and uplink symbols). For example, the time domain resource may be examples of slots, in which a radio frequency band is used for both transmitting uplink communications (e.g., uplink transmissions) and transmitting downlink communications (e.g., downlink transmissions). In some examples, the uplink transmissions and the downlink transmissions may occur in overlapping bands (e.g., for IUD operations) or adjacent bands (e.g., for SBFD operations).

For SBFD operations in which uplink transmissions and downlink transmissions occur in adjacent bands, a half-duplex communication device may either transmit in an uplink radio frequency band or receive in a downlink radio frequency band. That is, for a given time domain resource (e.g., for a given D+U slot or a given D+U symbol), the half-duplex device (e.g., the UE 115-*a*) may transmit uplink data (e.g., perform a physical uplink shared channel (PUSCH) transmission) in an uplink radio frequency band or receive downlink data in a downlink radio frequency band.

Additionally, or alternatively, for SBFD operations in which uplink and downlink transmissions occur in adjacent bands, a full-duplex device may transmit in the uplink radio frequency band and receive in the downlink radio frequency band. That is, for a given time domain resource (e.g., for a given D+U slot or a given D+U symbol), the full-duplex device may transmit uplink data (e.g., perform a PUSCH transmission) in an uplink radio frequency band and receive downlink data in a downlink radio frequency band. In the example of FIG. 2B, the UE 115-*b* (e.g., a full-duplex device) may transmit communications in an uplink radio frequency band, while receiving communications in a downlink radio frequency band (e.g., over a same D+U slot or a same D+U symbol).

In some examples, full-duplex communications may provide for latency reduction. For example, latency savings may be enabled by receiving downlink signal in uplink slots. Moreover, full-duplex communications may provide for spectrum efficiency enhancement (e.g., per cell or per UE 115), efficient resource utilization, and coverage extension, among other benefits. In some examples, however, full-duplex communications may lead to one or more types of interference, such as inter-cell interference (e.g., from neighboring communication devices), self-interference (e.g., for full-duplex communication devices), and cross-link interference (CLI) (e.g., inter-cell CLI or intra-cell CLI). For example, a communication device (e.g., one or more network entities 105, one or more UEs 115) may experience self-interference 220 (e.g., a self-interference 220-*a* or a self-interference 220-*b*) between a pair of beams, such as a beam used for transmitting communications and a beam used for receiving communications. In some examples, self-interference may result from signal leakage between an antenna panel used to transmit communications and an antenna panel used to receive communications (e.g., there is not enough beam separation between the beam used from transmitting communications and the beam used for receiving communications).

Additionally, or alternatively, neighboring communication devices (e.g., neighboring UEs 115, neighboring network entities 105) may perform full-duplex communications (or half-duplex TDD) concurrently, such that communications received by a first communication device may overlap in time with communications transmitted by a second communication device (e.g., a neighboring communication device). In such an example, the communications transmitted by the second communication device may interfere with the communications received at the first communication device. For example, the communications transmitted by the second communication device may lead to CLI at the first communications device. In some examples, CLI (e.g., CLI 215-*a*, CLI 215-*b*, CLI 215-*c*, or CLI 215-*d*) may result from energy leakage due to timing and frequency unalignment (e.g., misalignment) between the neighboring communication devices (e.g., clutter echo).

Additionally or alternatively CLI may result from automatic gain control (AGC) mismatch (e.g., misalignment). For example, as illustrated in the example of FIG. 2A, the AGC of the UE 115-*b* may be driven (e.g., controlled) by downlink communications from a serving cell (e.g., the network entity 105-*a*). In such an example, uplink communications transmitted from the UE 115-*a* may saturate the AGC of the UE 115-*b*, resulting in a misalignment (e.g., a loss of orthogonality) of the downlink communications received by the UE 115-*b* and the uplink communications transmitted by the UE 115-*a*. In some examples, the misalignment of the downlink communications and the uplink communications may lead to CLI 215-*a* at the UE 115-*b*.

In some examples, the network entity 105-*a* may be operating in a full-duplex mode (e.g., SBFD or IBFD) and the UEs 115 (e.g., the UE 115-*a*) may be operating in a half-duplex mode and a full-duplex mode (e.g., UE 115-*b*). For example, the network entity 105-*a* may receive uplink communications from the UE 115-*a* (e.g., via the communication link 205-*a*), while simultaneously transmitting downlink communications to a UE 115-*b* (e.g., via the communication link 210-*a*). In such an example, the full-duplex communications at the network entity 105-*a* may lead to self-interference 220-*a*. Additionally, or alternatively, the network entity 105-*a* and the network entity 105-*b* (e.g., neighboring network entities) may concurrently perform full-duplex communications, such that downlink signals transmitted by the network entity 105-*b* may overlap with uplink signals received by the network entity 105-*a*, leading to CLI 215-*b*.

Additionally, or alternatively, the UE 115-*a* and the UE 115-*b* (e.g., neighboring UEs) may concurrently perform communications such that uplink signals transmitted by the UE 115-*b* may overlap with downlink signals received by the UE 115-*a*, which may lead to CLI 215-*a*. In some examples, the UE 115-*a* may be operating in a cell different from the cell in which the UE 115-*b* may be operating. For example, the UE 115-*a* and the UE 115-*b* may be operating in adjacent cells. In an example, the CLI 215-*a* may be an example of inter-cell CLI. Additionally, or alternatively, the network entity 105-*b* may perform full-duplex communications concurrently with the network entity 105-*a*. In such an example, downlink communications transmitted by the network entity 105-*b* may lead to inter-cell interference at the UE 115-*b*. For example, the downlink communications transmitted by the network entity 105-*b* (e.g., to another UE (not shown)) may interfere with downlink communications received the UE 115-*b* (e.g., from the network entity 105-*a*).

In some other examples, the UE 115-*a* and the UE 115-*b* may be operating in a same cell. In such an example, the CLI 215-*a* may be an example of intra-cell CLI. For example, the network entity 105-*a* may be operating in a full-duplex mode (e.g., in SBFD), such that the network entity 105-*a* may configure downlink communications for the UE 115-*a* in frequency domain resources adjacent to the frequency domain resources allocated for uplink communications from the UE 115-*b*. For example, the network entity 105-*a* may configure the UE 115-*b* to receive downlink data (e.g., from the network entity 105-*a*) in a first time domain resource and in a downlink radio frequency band 2 and the UE 115-*a* may be configured to transmit uplink data in the first time domain resource in an uplink radio frequency band (e.g., the adjacent frequency resources). In such an example, the uplink communications transmitted by the UE 115-*a* may interfere with the downlink communications received at the UE 115-*b*.

In the example of FIG. 2B, the UE 115-*c* may be operating in a full-duplex mode (e.g., SBFD), such that the UE 115-*c* may receive downlink communications from the network entity 105-*d* via the communication link 210-*b*, while simultaneously transmitting uplink communications to the network entity 105-*c* via the communication link 205-*c*. In such an example, the full-duplex communications at the UE 115-*c* may lead to self-interference 220-*b*. In some examples of the wireless communications system 200-*b*, the network entity 105-*c* and the network entity 105-*d* may be examples of transmission and reception points and the UE 115-*c* (e.g., and the UE 115-*d*) may be operating in a multiple transmission and reception mode. In such an example, the uplink communications transmitted from the UE 115-*c* may lead to CLI 215-*c* (e.g., intra-cell CLI) at the UE 115-*d*.

In some cases, such as in the examples of FIGS. 2A and 2B, one or more network entities 105 may schedule a first transmission, such as an uplink transmission, and a second transmission, such as a downlink transmission, that at least partially overlap in time. Downlink transmissions may include, but are not limited to, physical downlink shared channel (PDSCH) transmissions, physical downlink control channel (PDCCH) transmissions, semi-persistent scheduling (SPS) transmissions, channel state information reference signals (CSI-RSs), and synchronization signal blocks (SBBs). Uplink transmissions may include, but are not limited to, PUSCH transmissions, physical uplink control channel (PUCCH) transmissions, sounding reference signals (SRSs), physical random access channel (PRACH) transmissions, and cell group (CG) signaling. In some cases, the uplink transmission, the downlink transmission, or both, may be periodic (e.g., periodic traffic). For example, downlink periodic CSI-RS may at least partially overlap with uplink CG occasions, downlink SPS may at least partially overlap with uplink CG occasions, or downlink SPS occasions may at least partially overlap with uplink periodic SRS, among other examples. Additionally, or alternatively, the uplink transmission, the downlink transmission, or both, may be aperiodic (e.g., aperiodic traffic). For example, downlink aperiodic CSI-RS or downlink dynamic PDSCH may at least partially overlap with uplink CG occasions or uplink dynamic PUSCH, uplink aperiodic SRS or uplink dynamic PUSCH may at least partially overlap with downlink SPS occasions, or uplink aperiodic SRS may at least partially overlap with downlink dynamic PDSCH, among other examples.

In some cases, the uplink transmission and the downlink transmission may be scheduled for a single UE 115, while in some other cases the uplink transmission may be scheduled for a first UE 115 and the downlink transmission may be scheduled for a second UE 115. For example, in FIG. 2A, the network entity 105-*a* may schedule an uplink transmission for the UE 115-*a* to be transmitted over the communication link 205-*a* and a downlink transmission for the UE 115-*b* to be received over the communication link 210-*a*, where the uplink transmission at least partially overlaps in time with the downlink transmission. Additionally, or alternatively, the uplink transmission and the downlink transmission may be scheduled (e.g., for a single UE 115) by a single network entity 105, while in some other cases, the uplink transmission may be scheduled (e.g., for a UE 115) by a first network entity 105 and the downlink transmission may be scheduled (e.g., for the UE 115) by a second network entity 105. For example, in FIG. 2B, the network entity 105-*c* may schedule an uplink transmission for the UE 115-*c* to be transmitted over the communication link 205-*c* and the network entity 105-*b* may schedule a downlink transmission for the UE 115-*c* to be received over the communication link 210-*b*, where the uplink transmission at least partially overlaps in time with the downlink transmission.

In some cases, a conflict may exist between the scheduled uplink transmission and the scheduled downlink transmission. That is, the uplink transmission may be scheduled via a first beam (e.g., according to a first TCI state) and the downlink transmission may be scheduled via a second beam (e.g., according to a second TCI state), such that the first beam is not compatible with the second beam. That is, the first beam may create self-interference with the second beam which may result in poor communication performance, failed transmissions (e.g., failure to support full-duplex capabilities), or the like thereof, due to the self-interference.

Techniques described herein may provide for a communication device, such as a UE 115 or a network entity 105, to perform a conflict resolution procedure while operating in a full-duplex mode. In some cases, such as in the example of FIG. 2A, a communication device, such as the network entity 105-*a*, may communicate one or more control messages 225 scheduling a first message, such as a downlink message 230, on a first beam (e.g., according to a first TCI state) and a second message, such as an uplink message 235, on a second beam (e.g., according to a second TCI state). For example, a network entity 105-*a* may transmit, to the UE 115-*b*, a control message 225 scheduling the downlink message 230 (e.g., to be received by the UE 115-*b*) and the uplink message 235 (e.g., to be transmitted by the UE 115-*b*). In some cases, the downlink message 230 may at least partially overlap in time with the uplink message 235 (e.g., one or more symbols of the downlink message 230 and the uplink message 235 may overlap in the time domain). Additionally, one or more conflicts may exist between the first beam and the second beam. For example, the first beam for the downlink message 230 may be incompatible with the second beam for the uplink message 235, such that the downlink message 230 creates self-interference with the uplink message 235 (e.g., or visa-versa). In some cases, the self-interference created between the downlink message 230 and the uplink message 235 may meet or exceed a threshold.

In some cases, the network entity 105-*a* may perform a conflict resolution procedure (e.g., apply a conflict resolution rule) based on the scheduled downlink message 230 at least partially overlapping with the scheduled uplink message 235 and the one or more conflicts between the first beam (e.g., for the downlink message 230) and the second beam (e.g., for the uplink message 235). In some examples, the network entity 105-*a* may perform the conflict resolution procedure based on priority values associated with the downlink message 230 and the uplink message 235. That is, the downlink message 230 may be associated with a first priority value and the uplink message 235 may be associated with a second priority value. In some cases, a priority value of a first message may be based on a priority value of a corresponding second message carrying a response, such as feedback, for the first message. For example, a priority value associated with a CSI-RS may be based on a corresponding PUCCH or a PUSCH carrying a CSI-RS report associated with the CSI-RS. In another example, a priority value associated with an SPS may be based on a corresponding PUCCH or a PUSCH carrying a feedback message (e.g., acknowledgment (ACK)/negative acknowledgment (NACK) message) for the SPS occasion.

In some cases, the network entity 105-*a* may compare the first priority value to the second priority value and perform the conflict resolution procedure based on the comparison. For example, the network entity 105-*a* may drop (e.g., refrain from transmitting or receiving) the downlink message 230 or the uplink message 235 based on the comparison of priority values, as described with reference to FIG. 3A. That is, the network entity 105-*a* may drop a message (e.g., the downlink message 230 or the uplink message 235) associated with a lower priority value. For example, the first priority value associated with the downlink message 230 may be greater than the second priority value associated with the uplink message 235. In such cases, the network entity 105-*a* may transmit the downlink message 230 on the first beam based on the scheduling (e.g., in the control message 225) and may refrain from receiving (e.g., refrain from monitoring for) the uplink message 235 (e.g., on the second beam). In another example, the first priority value associated with the downlink message 230 may be less than the second priority value associated with the uplink message 235. In such cases, the network entity 105-*a* may receive the uplink message 235 on the second beam and may refrain from transmitting the downlink message 230 (e.g., on the first beam).

Alternatively, the network entity 105-*a* may drop (e.g., refrain from transmitting or receiving) a portion of the downlink message 230 or a portion of the uplink message 235 based on the comparison of priority values, as described with reference to FIG. 3A. That is, the network entity 105-*a* may drop a portion of a message (e.g., the downlink message 230 or the uplink message 235) associated with a lower priority value, where the dropped portion of the message overlaps in time with at least a portion of a message associated with a higher priority value. For example, the first priority value associated with the downlink message 230 may be greater than the second priority value associated with the uplink message 235 and the network entity 105-*a* may drop a portion (e.g., a first portion) of the uplink message 235. That is, the network entity 105-*a* may drop a portion (e.g., a first portion) of the uplink message 235 that is associated with symbols that overlap in the time domain with symbols associated with at least a portion of the downlink message 230 (e.g., drop traffic of a lower priority message that overlaps in duration with a higher priority message). In such cases, the network entity 105-*a* may transmit the downlink message 230 on the first beam (e.g., over a first set of time resources) and may receive a portion (e.g., a second portion) of the uplink message 235 on the second beam (e.g., over a second set of time resources, where the second set of time resources is different than the first set of time resources). In other words, the network entity 105-*a* may refrain from receiving (e.g., refrain from monitoring for) a portion (e.g., a first portion) of the uplink message 235 that overlaps in time with the downlink message 230 (e.g., over the first set of time resources). In another example, the first priority value associated with the downlink message 230 may be less than the second priority value associated with the uplink message 235 and the network entity 105-*a* may drop a portion (e.g., a first portion) of the downlink message 230. In such cases, the network entity 105-*a* may receive the uplink message 235 on the second beam (e.g., over a first set of time resources) and may transmit a portion (e.g., a second portion) of the downlink message 230 on the first beam (e.g., over a second set of time resources, where the second set of time resources is different than the first set of time resources). In other words, the network entity 105-*a* may refrain from transmitting a portion (e.g., a first portion) of the downlink message 230 that overlaps in time with the uplink message 235 (e.g., over the first set of time resources).

Additionally, or alternatively, the network entity 105-*a* may change a beam (e.g., change a TCI state) for the downlink message 230 or for the uplink message 235 based on the comparison of priority values, as described with reference to FIG. 3B. That is, the network entity 105-*a* may change a beam for communicating (e.g., transmitting or receiving) a message associated with a lower priority value. For example, the first priority value associated with the downlink message 230 may be greater than the second priority value associated with the uplink message 235. In such cases, the network entity 105-*a* may change a beam used to receive the uplink message 235. In other words, the network entity 105-*a* may transmit the downlink message 230 on the first beam (e.g., according to the first TCI state) and may receive the uplink message 235 on a third beam (e.g., according to a third TCI state), where the third beam is different than the second beam (e.g., the second TCI state) and is compatible with the first beam (e.g., the self-interference between the first beam and third beam is less than the threshold).

In some cases, the network entity 105-a may select the third beam based on a beam pair (e.g., TCI state pair). For example, the network entity 105-a may perform beam pair measurements and may select the third beam from a beam pair based on the beam pair measurements (e.g., latest beam pair measurements). That is, the network entity 105-a may measure self-interference between each pair of beams (e.g., beam pairs) from a set of beam pairs to determine self-interference between the pair of beams. Additionally, the network entity 105-a may identify, from the set of measure beam pairs, one or more beam pairs that include the first beam and may identify a beam pair with lowest self-interference (e.g., from the one or more measure beam pairs that include the first beam). Thus, the network entity 105-a may select the third beam from the measured beam pair with the lowest self-interference (e.g., from the one or more measure beam pairs that include the first beam) based on the beam pair measurements. In some cases, the network entity 105-a may transmit an indication of the measured beam pairs to the UE 115-b. In another example, the network entity 105-a may select the third beam from a beam pair based on one or more parameters at the network entity 105-a. That is, the network entity 105-a may be configured (e.g., may be preconfigured) with a set of beam pairs (e.g., in a beam pair list), where the set of beam pairs include compatible beam pairs (e.g., beam pairs with interference less than a threshold). In such cases, the network entity 105-a may identify a beam pair, from the set of beam pairs, that includes the first beam and may select the third beam from the beam pair that includes the first beam (e.g., the beam pair may include the first beam and the third beam). In some cases, the set of beam pairs may include multiple beam pairs that include the first beam. In such cases, the network entity 105-a may select a beam pair from the multiple beam pairs based on an order of the multiple beam pairs. That is, the set of beam pairs may be arranged in an order (e.g., based on the beam pair list) and the network entity 105-a may select the beam pair from the multiple beam pairs based on a first occurring beam pair that includes the first beam (e.g., the beam pair occurs first in the order).

In some cases, the first priority value associated with the downlink message 230 may be equal to the second priority value associated with the uplink message 235. In such cases, the network entity 105-a may perform the conflict resolution procedure based on a determination at the network entity 105-a (e.g., up to network entity 105-a implementation). That is, the network entity 105-a may determine to change a beam or drop (e.g., all or a portion of) a message based on additional parameters, such as other traffic at the network entity 105-a, contents of the message, power level of the network entity 105-a, or the like thereof. For example, the network entity 105-a may change a beam of the downlink message 230 or the uplink message 235 at the network entity 105-a, such that the UE 115-b may refrain from changing a beam of the downlink message 230 or the uplink message 235 (e.g., the network entity 105-a may change a transmit or receive beam at the network entity 105-a such that the changed transmit or receive beam is compatible with a transmit or receive beam at the UE 115-b).

Additionally, or alternatively, the network entity 105-a may transmit a feedback message indicating a suggested conflict resolution procedure. For example, the network entity 105-a may transmit, to the UE 115-b, a feedback message including an indication to drop all or a portion of the downlink message 230 or the uplink message 235. In another example, the feedback message may include an indication of a beam change associated with the downlink message 230 or the uplink message 235 (e.g., the feedback message may indicate a new beam to use for communicating the downlink message 230 or the uplink message 235).

While much of the present disclosure is described in the context of a conflict resolution procedure performed by the network entity 105-a based on messages scheduled with the UE 115-b, this is not to be regarded as a limitation of the present disclosure. Indeed, it is contemplated herein that the network entity 105-a may transmit the control message 225 scheduling the downlink message 230 to be received by the UE 115-b and the uplink message 235 to be transmitted by the UE 115-b, and may perform the conflict resolution procedure based on the downlink message 230 and the uplink message 235. In this regard, conflict resolution procedures performed based on messages scheduled with one or more UEs 115 may be considered regarding the techniques described herein. For example, the network entity 105-a may schedule a downlink message 230 for the UE 115-b on a first beam and may schedule an uplink message 235 for the UE 115-b on a second beam. Additionally, the network entity 105-a may perform a conflict resolution procedure for the downlink message 230 and the uplink message 235 based on the downlink message 230 at least partially overlapping with the uplink message 235 and based on a conflict between the first beam and the second beam.

Additionally, while much of the present disclosure is described in the context of a conflict resolution procedure performed by the network entity 105-a, this is not to be regarded as a limitation of the present disclosure. Indeed, it is contemplated herein that the network entity 105-a may transmit the control message 225 scheduling the downlink message 230 over the first beam and the uplink message 235 over the second beam and may perform the conflict resolution procedure based on the downlink message 230 overlapping at least partially in time with the uplink message 235 and the conflict between the first beam and the second beam. In this regard, conflict resolution procedures performed by a UE 115, such as the UE 115-b, may be considered regarding the techniques described herein. For example, the UE 115-b may perform the conflict resolution procedure for the downlink message 230 and the uplink message 235 such that the UE 115-b may drop a message associated with a lower priority value or drop a message based on a feedback message communicated with the UE 115-b, described with reference to FIG. 3A. Additionally, or alternatively, the UE 115-b may perform the conflict resolution procedure for the downlink message 230 and the uplink message 235 such that the UE 115-b changes the beam of the message associated with the lower priority value or changes the beam of the message based on the feedback message communicated with the UE 115-b, described with reference to FIG. 3B. In some cases, the UE 115-b and the network entity 105-a may perform a conflict resolution procedure in parallel (e.g., based on one or more configurations of the UE 115-b and the network entity 105-a).

Figure 3A:
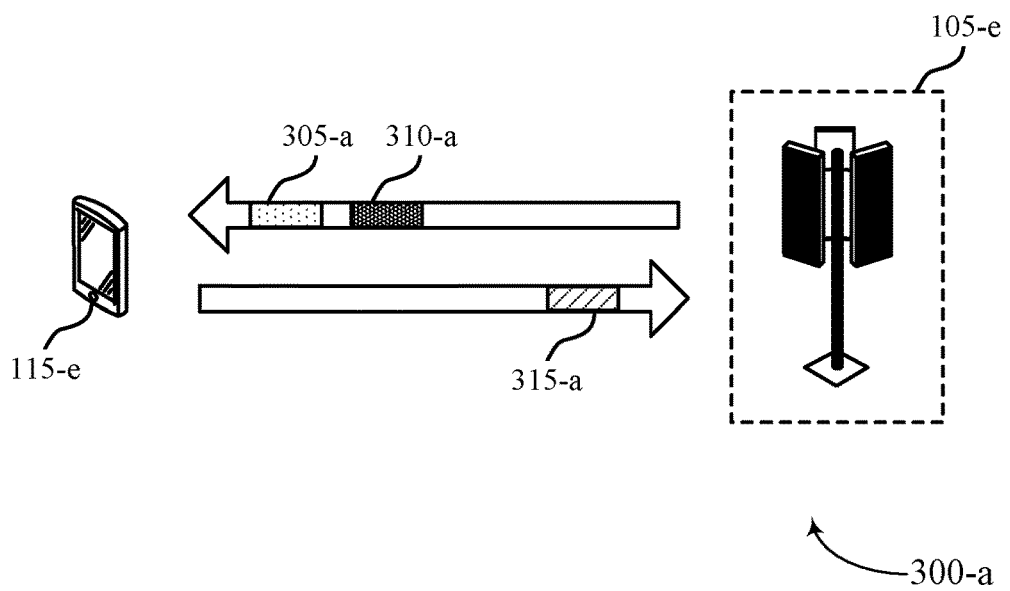
Figure 3B:
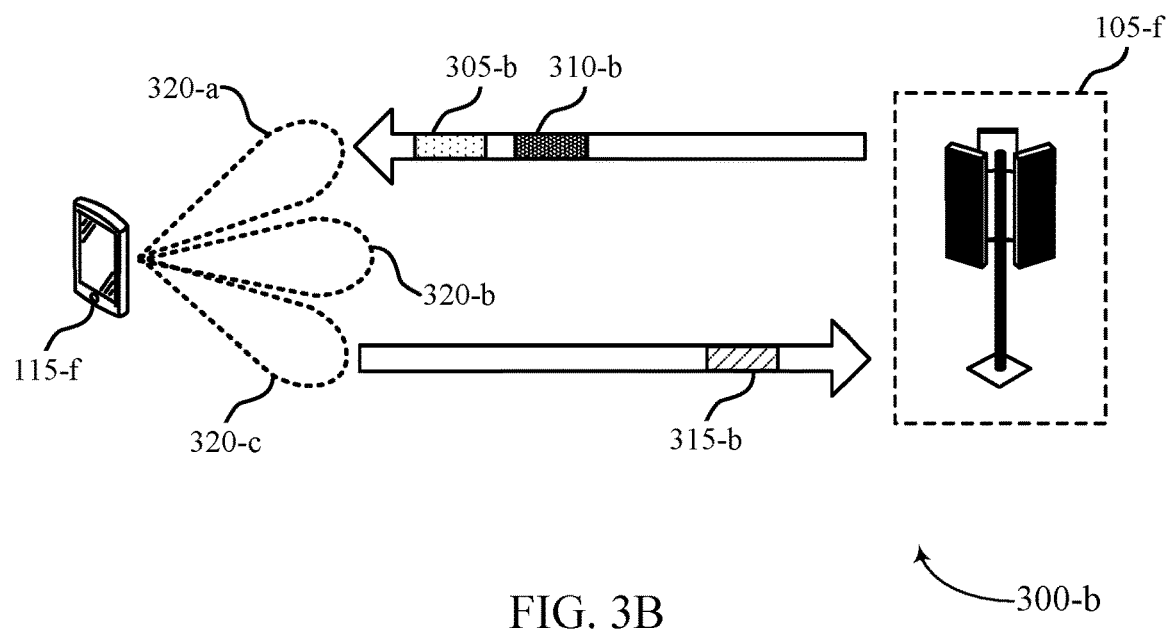

FIGS. 3A and 3B each illustrate an example of a wireless communications system 300 that supports priority based conflict resolution in full-duplex operations in accordance with one or more aspects of the present disclosure. In some examples, the wireless communications systems 300 (e.g., a wireless communications system 300-a and a wireless communications system 300-b) may implement aspects of the wireless communications system 100 and the wireless communications systems 200. For example, the wireless communications systems 300 may each include one or more network entities 105 (e.g., a network entity 105-*e* and a network entity 105-*f*) and one or more UEs 115 (e.g., a UE 115-*e* and a UE 115-*f*), which may be examples of the corresponding devices described with reference to FIG. 1. In the example of FIGS. 3A and 3B, the network entities 105 may be examples of a CU 160, a DU 165, an RU 170, a base station 140, an IAB node 104, or one or more other network nodes as described with reference to FIG. 1. The wireless communications systems 300 may include techniques for a wireless device, operating in a full-duplex mode, to perform a conflict resolution procedure for a first message, such as a downlink message 310, scheduled on a first beam 320-*a* (e.g., associated with a first TCI state) and a second message, such as an uplink message 315, scheduled on a second beam 320-*b* (e.g., associated with a second TCI state) based on the downlink message 310 at least partially overlapping in time with the uplink message 315 and a conflict between the first beam 320-*a* and the second beam 320-*b*.

In some cases, as illustrated in FIGS. 3A and 3B, a communication device, such as a UE 115 (e.g., a UE 115-*e* or a UE 115-*f*), may communicate (e.g., receive) one or more control messages 305 scheduling a first message, such as a downlink message 310, on the first beam 320-*a* and a second message, such as an uplink message 315, on the second beam 320-*b*. In some cases, at least a portion of the downlink message 310 may overlap in time with the uplink message 315 and one or more conflicts may exist between the first beam 320-*a* and the second beam 320-*b*. For example, the self-interference between the first beam 320-*a* and the second beam 320-*b* may meet or exceed a threshold. In such cases, the UE 115 may perform a conflict resolution procedure based on the downlink message 310 at least partially overlapping in time with the uplink message 315 and the one or more conflicts between the first beam 320-*a* and the second beam 320-*b*.

In some cases, the UE 115 may perform a conflict resolution procedure based on priority values associated with the downlink message 310 and the uplink message 315. That is, the downlink message 310 may be associated with a first priority value and the uplink message 315 may be associated with a second priority value. For example, the UE 115 may compare the first priority value to the second priority value and perform the conflict resolution procedure based on the comparison.

In some cases, as illustrated in FIG. 3A, the UE 115, such as the UE 115-*e*, may drop (e.g., refrain from transmitting or receiving) the downlink message 310, such as a downlink message 310-*a*, or the uplink message 315, such as an uplink message 315-*a*, based on the comparison. That is, the UE 115-*e* may drop a message, such as the downlink message 310-*a* or the uplink message 315-*a*, associated with a lower priority value. For example, the network entity 105-*e* may transmit a control message 305-*a* scheduling the downlink message 310-*a*, associated with a first priority value, on a first beam 320-*a* and the uplink message 315-*a*, associated with a second priority value, on a second beam 320-*b*. In some cases, the downlink message 310-*a* may at least partially overlap in time with the uplink message 315-*a* and self-interference between the first beam 320-*a* and the second beam 320-*b* may exceed a threshold.

In some cases, the first priority value associated with the downlink message 310-*a* may be greater than the second priority value associated with the uplink message 315-*a*. In such cases, the UE 115-*e* may drop a portion or all of the uplink message 315-*a*. For example, the UE 115-*e* may receive the downlink message 310-*a* and refrain from receiving (e.g., refrain from monitoring for) the uplink message 315-*a*. In another example, the UE 115-*e* may receive the downlink message 310-*a* over a first set of time resources and transmit a portion of the uplink message 315-*a* (e.g., a portion of the uplink message 315-*a* that does not overlap with the downlink message 310-*a*) over a second set of time resources, where the second set of time resources is different that the first set of time resources.

In some other cases, the first priority value associated with the downlink message 310-*a* may be less than the second priority value associated with the uplink message 315-*a*. In such cases, the UE 115-*e* may drop a portion or all of the downlink message 310-*a*. For example, the UE 115-*e* may transmit the uplink message 315-*a* and refrain from receiving (e.g., refrain from monitoring for) the downlink message 310-*a*. In another example, the UE 115-*e* may transmit the uplink message 315-*a* (e.g., over a first set of time resources) and receive a portion of the downlink message 310-*a* that does not overlap with the uplink message 315-*a* (e.g., over a second set of time resources, where the second set of time resources is different that the first set of time resources).

Additionally, or alternatively, as illustrated in FIG. 3B, the UE 115, such as the UE 115-*f*, may change a beam 320 (e.g., change a TCI state) for the downlink message 310, such as a downlink message 310-*b*, or for the uplink message 315, such as the uplink message 315-*b*, based on the comparison of priority values. That is, the UE 115-*f* may change a beam 320 for communicating (e.g., transmitting or receiving) a message, such as the downlink message 310-*b* or the uplink message 315-*a*, associated with a lower priority value. For example, the network entity 105-*f* may transmit a control message 305-*b* scheduling the downlink message 310-*b*, associated with a first priority value, on the first beam 320-*a* and the uplink message 315-*b*, associated with a second priority value, on the second beam 320-*b*. Additionally, the downlink message 310-*b* may at least partially overlap in time with the uplink message 315-*b* and self-interference between the first beam 320-*a* and the second beam 320-*b* may exceed a threshold (e.g., the first beam 320-*a* and the second beam 320-*b* may be incompatible). In some cases, the first priority value associated with the downlink message 310-*b* may be greater than the second priority value associated with the uplink message 315-*b*. In such cases, the UE 115-*f* may change a beam 320 for transmitting the uplink message 315-*b* from the second beam 320-*b* to a third beam 320-*c*. That is, the UE 115-*f* may receive the downlink message 310-*b* on the first beam 320-*a* and may transmit the uplink message 315-*b* on the third beam 320-*c*. In some cases, the first beam 320-*a* and the third beam 320-*c* may be part of a beam pair, as described with reference to FIG. 2A.

In another example, the network entity 105-*f* may transmit the control message 305-*b* scheduling the downlink message 310-*b*, associated with the first priority value, on the second beam 320-*b* and the uplink message 315-*b*, associated with a second priority value, on the third beam 320-*c*. Additionally, the downlink message 310-*b* may at least partially overlap in time with the uplink message 315-*b* and self-interference between the second beam 320-*b* and the third beam 320-*c* may exceed a threshold (e.g., the second beam 320-*b* and the third beam 320-*c* may be incompatible). In some cases, the first priority value associated with the downlink message 310-*b* may be greater than the second priority value associated with the uplink message 315-*b* and the UE 115-*f* may change a beam 320 for receiving the downlink message 310-*b* from the second beam 320-*b* to the first beam 320-*a*. That is, the UE 115-*f* may receive the downlink message 310-*b* on the first beam 320-*a* and may transmit the uplink message 315-*b* on the third beam 320-*c*. In some cases, the first beam 320-*a* and the third beam 320-*c* may be part of a beam pair, as described with reference to FIG. 2A. Additionally, self-interference between the first beam 320-*a* and the third beam 320-*c* may be less than or equal to the threshold (e.g., the first beam 320-*a* and the third beam 320-*c* may be compatible for full-duplex operations).

Additionally, or alternatively, the UE 115, such as the UE 115-*e* or the UE 115-*f*, may transmit a feedback message indicating a suggested conflict resolution procedure. For example, the UE 115-*e* may transmit, to the network entity 105-*e*, a feedback message including an indication to drop all or a portion of the downlink message 310-*a* or the uplink message 315-*a*. In another example, the UE 115-*f* may transmit, to the network entity 105-*f*, a feedback message including an indication of a beam change associated with the downlink message 310-*b* or the uplink message 315-*b* (e.g., the feedback message may indicate a beam 320 to use for communicating the downlink message 310-*b* or the uplink message 315-*b*).

While much of the present disclosure is described in the context of a conflict resolution procedure performed by the UE 115-*e* or the UE 115-*f* based on messages scheduled with the network entity 105-*e* or the network entity 105-*f* respectively, this is not to be regarded as a limitation of the present disclosure. Indeed, it is contemplated herein that a network entity 105 may transmit a control message 305 scheduling a downlink message 310 to be received by a UE 115 and an uplink message 315 to be transmitted by the UE 115, and the UE 115 may perform the conflict resolution procedure based on the downlink message 310 and the uplink message 315. In this regard, conflict resolution procedures performed based on messages scheduled by one or more network entities 105 may be considered regarding the techniques described herein. For example, a first network entity 105 may schedule a downlink message 310 for the UE 115 on a first beam 320-*a* and a second network entity 105 may schedule an uplink message 315 for the UE 115 on a second beam 320-*b*. Additionally, the UE 115 may perform a conflict resolution procedure for the downlink message 310 and the uplink message 315 based on the downlink message 310 at least partially overlapping with the uplink message 315 and based on a conflict between the first beam 320-*a* and the second beam 320-*b*.

Additionally, while much of the present disclosure is described in the context of a conflict resolution procedure performed by a UE 115, such as the UE 115-*e* and the UE 115-*f*, this is not to be regarded as a limitation of the present disclosure. Indeed, it is contemplated herein that a UE 115 may receive a control message 305 scheduling a downlink message 310 over a first beam 320-*a* and the uplink message 315 over a second beam 320-*b*, and may perform the conflict resolution procedure based on the downlink message 310 overlapping at least partially in time with the uplink message 315 and the conflict between the first beam 320-*a* and the second beam 320-*b*. In this regard, conflict resolution procedures performed by a network entity 105, as described with reference to FIG. 2A, may be considered regarding the techniques described herein. For example, the network entity 105-*e* may perform the conflict resolution procedure for the downlink message 310-*a* and the uplink message 315-*a* such that the network entity 105-*e* may drop a message associated with a lower priority value or drop a message based on a feedback message communicated with the UE 115-*e*. Additionally, or alternatively, the network entity 105-*f* may perform the conflict resolution procedure for the downlink message 310-*b* and the uplink message 315-*b* such that the network entity 105-*f* changes a beam 320 of the message associated with the lower priority value or changes a beam 320 of the message based on the feedback message communicated with the UE 115-*f*. In some cases, a UE 115 and a network entity 105 may perform a conflict resolution procedure in parallel.

Figure 4:
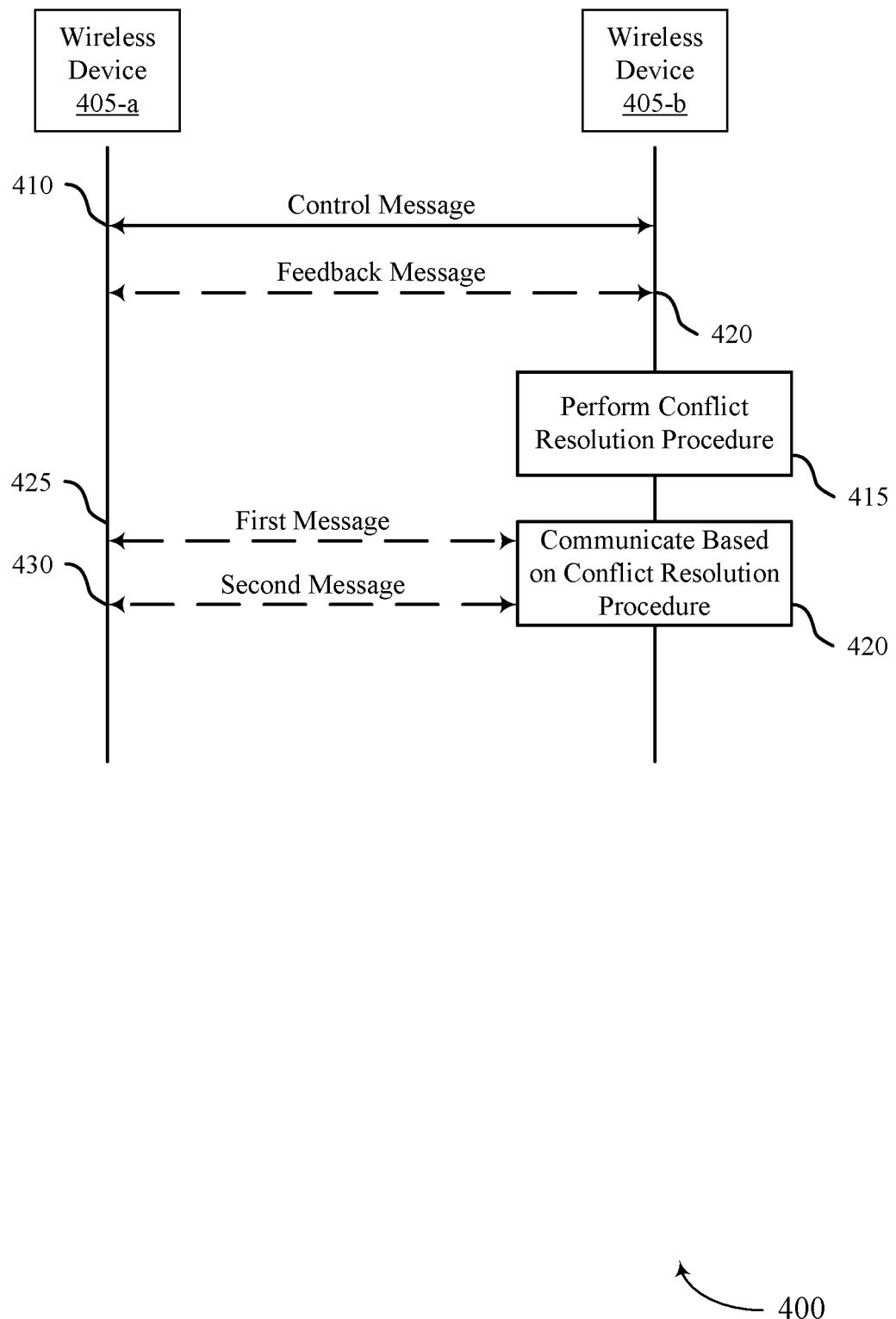
FIGS. 4 and 5 each illustrate an example of a process flow that supports priority based conflict resolution in full-duplex operations in accordance with one or more aspects of the present disclosure.

FIG. 4 illustrates an example of a process flow 400 that supports priority based conflict resolution in full-duplex operations in accordance with one or more aspects of the present disclosure. In some examples, the process flow 400 may implement aspects of the wireless communications system 100, the wireless communications systems 200, and the wireless communications systems 300. For example, the process flow 400 may include one or wireless devices (e.g., a first wireless device 405-*a* and a second wireless device 405-*b*), which may be examples of one or more UEs 115, one or more network entities 105, or both, described with reference to FIG. 1. The process flow 400 may include techniques for a wireless device, operating in a full-duplex mode, to perform a conflict resolution procedure for a first message associated with a first TCI state (e.g., schedule on a first beam) and a second message associated with a second TCI state (e.g., scheduled on a second beam) based on the first message at least partially overlapping in time with the second message and a conflict between the first TCI state and the second TCI state.

At 410, the first wireless device 405-*a* and the second wireless device 405-*b* may communicate one or more control messages scheduling a first message (e.g., a downlink message or an uplink message) associated with a first TCI state and scheduling a second message (e.g., an uplink message or a downlink message) associated with a second TCI state, where at least a portion of the first message overlaps in time with the second message. In some cases, the second wireless device 405-*b* may be a UE 115. In such cases, the UE 115 may receive the one or more control messages scheduling the first message associated with the first TCI state and scheduling the second message associated with the second TCI state. In some other cases, the second wireless device 405-*b* may be a network entity 105. In such cases, the network entity 105 may the transmit the one or more control messages scheduling the first message associated with the first TCI state and scheduling the second message associated with the second TCI state.

In some cases, at 415, the second wireless device 405-*b* may communicate a feedback message indicating a conflict resolution procedure (e.g., suggested procedure) based on the first message at least partially overlapping in time with the second message and a conflict between the first TCI state and the second TCI state. In some cases, the conflict may be based on interference between the first TCI state and the second TCI state. That is, the second wireless device 405-*b* may measure interference between first message associated with the first TCI state and the second message associated with the second TCI state, where the conflict is based on the interference being greater than a threshold.

At 420, the second wireless device 405-*b* may perform a conflict resolution procedure for the first message and the second message based on the first message at least partially overlapping in time with the second message and a conflict between the first TCI state and the second TCI state. In some cases, the second wireless device 405-*b* may perform the conflict resolution procedure based on the feedback message.

At 420, the second wireless device 405-*b* may communicate at least the first message based at least in part on the conflict resolution procedure. For example, at 425, the second wireless device 405-*b* may communicate the first message according to the first TCI state and, at 425, may refrain from communicating the second message based on the feedback message. In another example, at 425, the second wireless device 405-*b* may communicate, over a first set of time resources, the first message according to the first TCI state and, at 430, may communicate, over a second set of time resources different from the first set of time resources, a portion of the second message according to the second TCI state based on the feedback message. In another example, the second wireless device 405-*b* may communicate the first message according to the first TCI state and, at 425, may communicate the second message according to a third TCI state based on the feedback message, where the third TCI state is different than the second TCI state.

While much of the present disclosure is described in the context of a single wireless device 405, such as the second wireless device 405-*b*, performing a conflict resolution procedure, this is not be regarded as a limitation of the present disclosure. In this regard, conflict resolution procedures may be performed by multiple wireless devices 405 in parallel, such that a first wireless device 405, such as the second wireless device 405-*b*, and a second wireless device 405, such as the first wireless device 405-*a*, may perform the techniques described at 410 through 430 in parallel. For example, the first wireless device 405-*a* and the second wireless device 405-*b* may perform a conflict resolution procedure simultaneously, such that the first wireless device 405-*a* may refrain from transmitting a second message while the second wireless device 405-*b* refrains from receiving (e.g., monitoring for) the second message based on a feedback message, communicated between the first wireless device 405-*a* and the second wireless device 405-*b*, indicating the conflict resolution procedure. That is, the second wireless device 405-*b* may expect the first wireless device 405-*a* to refrain from transmitting the second message based on the conflict resolution procedure.

Figure 5:
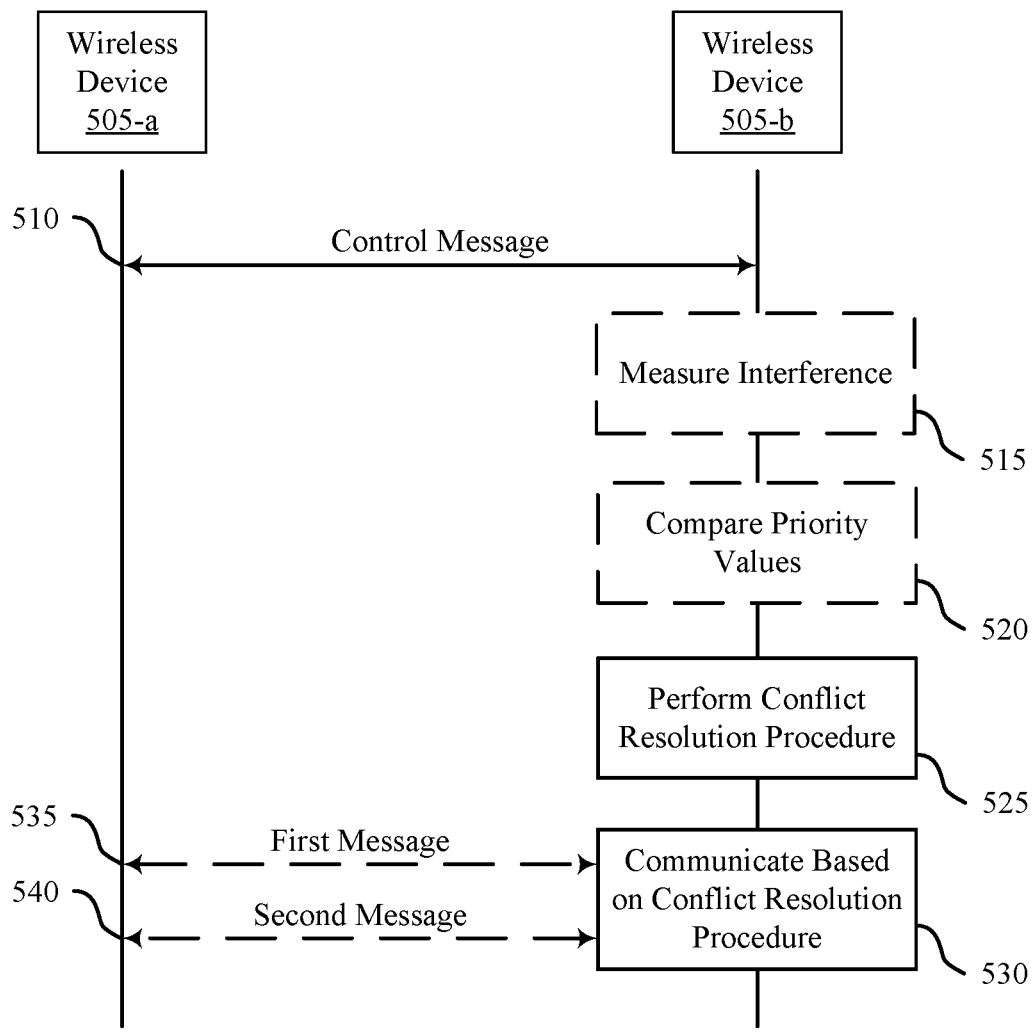

FIG. 5 illustrates an example of a process flow 500 that supports priority based conflict resolution in full-duplex operations in accordance with one or more aspects of the present disclosure. In some examples, the process flow 500 may implement aspects of the wireless communications system 100, the wireless communications systems 200, the wireless communications systems 300, and the process flow 400. For example, the process flow 500 may include one or wireless devices (e.g., a first wireless device 505-*a* and a second wireless device 505-*b*), which may be examples of one or more UEs 115, one or more network entities 105, or both, described with reference to FIG. 1. The process flow 500 may include techniques for a wireless device, operating in a full-duplex mode, to perform a conflict resolution procedure for a first message associated with a first TCI state (e.g., schedule on a first beam) and a second message associated with a second TCI state (e.g., scheduled on a second beam) based on the first message at least partially overlapping in time with the second message and a conflict between the first TCI state and the second TCI state.

At 510, the first wireless device 505-*a* and the second wireless device 505-*b* may communicate one or more control messages scheduling a first message (e.g., a downlink message or an uplink message) associated with a first TCI state and scheduling a second message (e.g., an uplink message or a downlink message) associated with a second TCI state, where at least a portion of the first message overlaps in time with the second message. In some cases, the second wireless device 505-*b* may be a UE 115. In such cases, the UE 115 may receive the one or more control messages scheduling the first message associated with the first TCI state and scheduling the second message associated with the second TCI state. In some other cases, the second wireless device 505-*b* may be a network entity 105. In such cases, the network entity 105 may the transmit one or more control messages scheduling the first message associated with the first TCI state and scheduling the second message associated with the second TCI state.

In some cases, at 515, the second wireless device 505-*b*, may measure interference between the first message associated with the first TCI state and the second message associated with the second TCI state. In other words, the wireless device may determine whether the first TCI state (e.g., first beam) is compatible with the second TCI state (e.g., second beam). In some cases, the interference between the first message associated with the first TCI state and the second message associated with the second TCI state may be below a threshold and the second wireless device 505-*b* may determine the first TCI state and the second TCI state are compatible. In some other cases, the interference between the first message associated with the first TCI state and the second message associated with the second TCI state may be greater than or equal to a threshold and the second wireless device 505-*b* may determine there is a conflict between the first TCI state and the second TCI state (e.g., the TCI states are incompatible).

In some cases, at 520, the second wireless device 505-*b* may compare a first priority value associated with the first message to a second priority value associated with the second message.

At 525, the second wireless device 505-*b* may perform a conflict resolution procedure for the first message and the second message based on the first message at least partially overlapping in time with the second message and a conflict between the first TCI state and the second TCI state. Additionally, the conflict resolution procedure may be based on the comparison between the first priority value associated with the first message and the second priority value associated with the second message.

At 530, the second wireless device 505-*b* may communicate at least the first message based at least in part on the conflict resolution procedure. In some cases, the first priority value may be greater than the second priority value and, at 535, the second wireless device 505-*b* may communicate the first message according to the first TCI state and, at 540, refrain from communicating the second message based on the first priority value being greater than the second priority value. For example, the second wireless device 505-*b* may transmit the first message according to the first TCI state and may refrain from receiving the second message based on the first priority value being greater than the second priority value. In another example, the second wireless device 505-*b* may receive the first message according to the first TCI state and may refrain from transmitting the second message based on the first priority value being greater than the second priority value.

In some cases, the first priority value may be greater than the second priority value and, at 535, the second wireless device 505-*b* may communicate the first message, over a first set of time resources, according to the first TCI state and, at 540, communicate a portion of the second message, over a second set of time resources different than the first set of time resources, according to the second TCI state based on the first priority value being greater than the second priority value. For example, the second wireless device 505-*b* may transmit, over the first set of time resources, the first message according to the first TCI state and may receive, over the second set of time resource different from the first set of time resources, the portion of the second message according to the second TCI state. In another example, the second wireless device 505-*b* may receive, over the first set of time resources, the first message according to the first TCI state and may transmit, over the second set of time resource different from the first set of time resources, the portion of the second message according to the second TCI state.

In some cases, the first priority value may be greater than the second priority value and, at 535, the second wireless device 505-*b* may communicate the first message according to the first TCI state and, at 540, communicate the second message according to a third TCI state, different from the second TCI state, based on the first priority value being greater than the second priority value. For example, the second wireless device 505-*b* may transmit the first message according to the first TCI state and may receive the second message according to the third TCI state. In another example, the second wireless device 505-*b* may receive the first message according to the first TCI state and may transmit the second message according to the third TCI state.

In some cases, the second wireless device 505-*b* may select the third TCI state based on a first TCI state pair from a set of TCI state pairs (e.g., a TCI state pair list), where the first TCI state pair includes the first TCI state and the third TCI state. In some examples, the set of TCI state pairs may be based on one or more measurements (e.g., TCI state pair measurements). That is, the second wireless device 505-*b* may perform one or more measurements of one or more pairs of TCI states, where the set of TCI state pairs is based at least in part on performing the one or more measurements. In some other examples, the set of TCI state pairs may be based on one or more parameters at the second wireless device 505-*b* (e.g., the second wireless device 505-*b* may be preconfigured with the set of TCI state pairs). In some cases, the second wireless device 505-*b* may communicate (e.g., transmit) an indication of the set of TCI state pairs (e.g., to the first wireless device 505-*a*).

While much of the present disclosure is described in the context of a single wireless device 505, such as the second wireless device 505-*b*, performing a conflict resolution procedure, this is not be regarded as a limitation of the present disclosure. In this regard, conflict resolution procedures may be performed by multiple wireless devices 505 in parallel, such that a first wireless device 505, such as the second wireless device 505-*b*, and a second wireless device 505, such as the first wireless device 505-*a*, may perform the techniques described at 510 through 540 in parallel. For example, the first wireless device 505-*a* and the second wireless device 505-*b* may perform a conflict resolution procedure simultaneously, such that the first wireless device 505-*a* refrains from transmitting the second message while the second wireless device 505-*b* refrains from receiving (e.g., monitoring for) the second message. That is, the second wireless device 505-*b* may expect the first wireless device 505-*a* to refrain from transmitting the second message based on the conflict resolution procedure. In another example, the first wireless device 505-*a* and the second wireless device 505-*b* may perform a conflict resolution procedure simultaneously, such that second wireless device 505-*b* transmits the second message according to the third TCI state and the first wireless device 505-*a* receives the second message according to the third TCI state. That is, the first wireless device 505-*a* may expect to receive the second message according to the third TCI state based on the conflict resolution procedure (e.g., and based on the preconfigured set of TCI state pairs or the indication of the set of TCI state pairs transmitted by the second wireless device 505-*b*).

Figure 6:
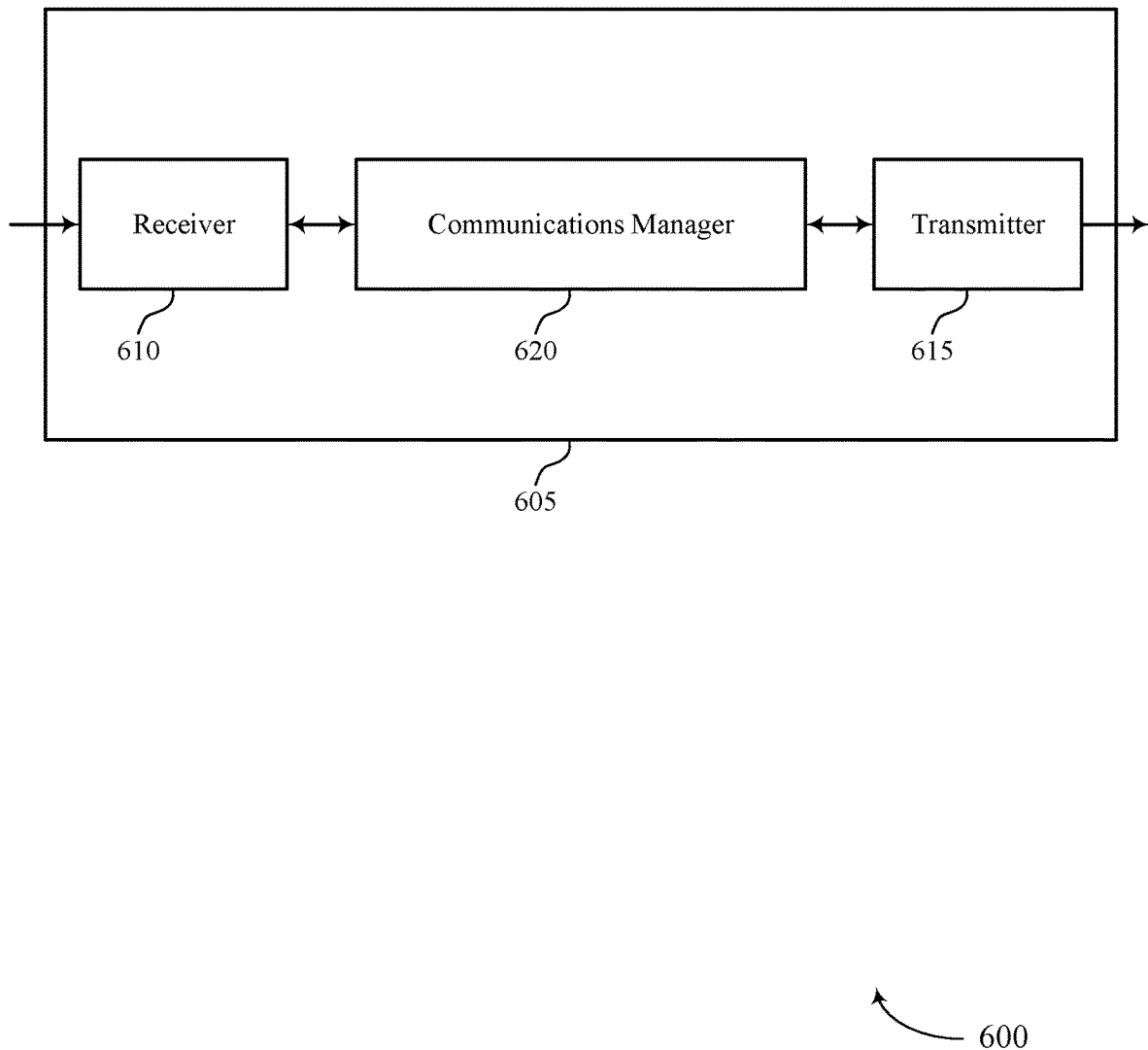
FIGS. 6 and 7 show block diagrams of devices that support priority based conflict resolution in full-duplex operations in accordance with one or more aspects of the present disclosure.

FIG. 6 shows a block diagram 600 of a device 605 that supports priority based conflict resolution in full-duplex operations in accordance with one or more aspects of the present disclosure. The device 605 may be an example of aspects of a UE 115 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to priority based conflict resolution in full-duplex operations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to priority based conflict resolution in full-duplex operations). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of priority based conflict resolution in full-duplex operations as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a wireless device in accordance with examples as disclosed herein. For example, the communications manager 620 may be configured as or otherwise support a means for communicating one or more control messages scheduling a first message associated with a first TCI state and scheduling a second message associated with a second TCI state, where at least a portion of the first message overlaps in time with the second message. The communications manager 620 may be configured as or otherwise support a means for performing a conflict resolution procedure for the first message and the second message based on the first message at least partially overlapping in time with the second message and a conflict between the first TCI state and the second TCI state. The communications manager 620 may be configured as or otherwise support a means for communicating at least the first message based on the conflict resolution procedure.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for priority based conflict resolution which may result in reduced processing, reduced power consumption, and more efficient utilization of communication resources, among other advantages.

Figure 7:
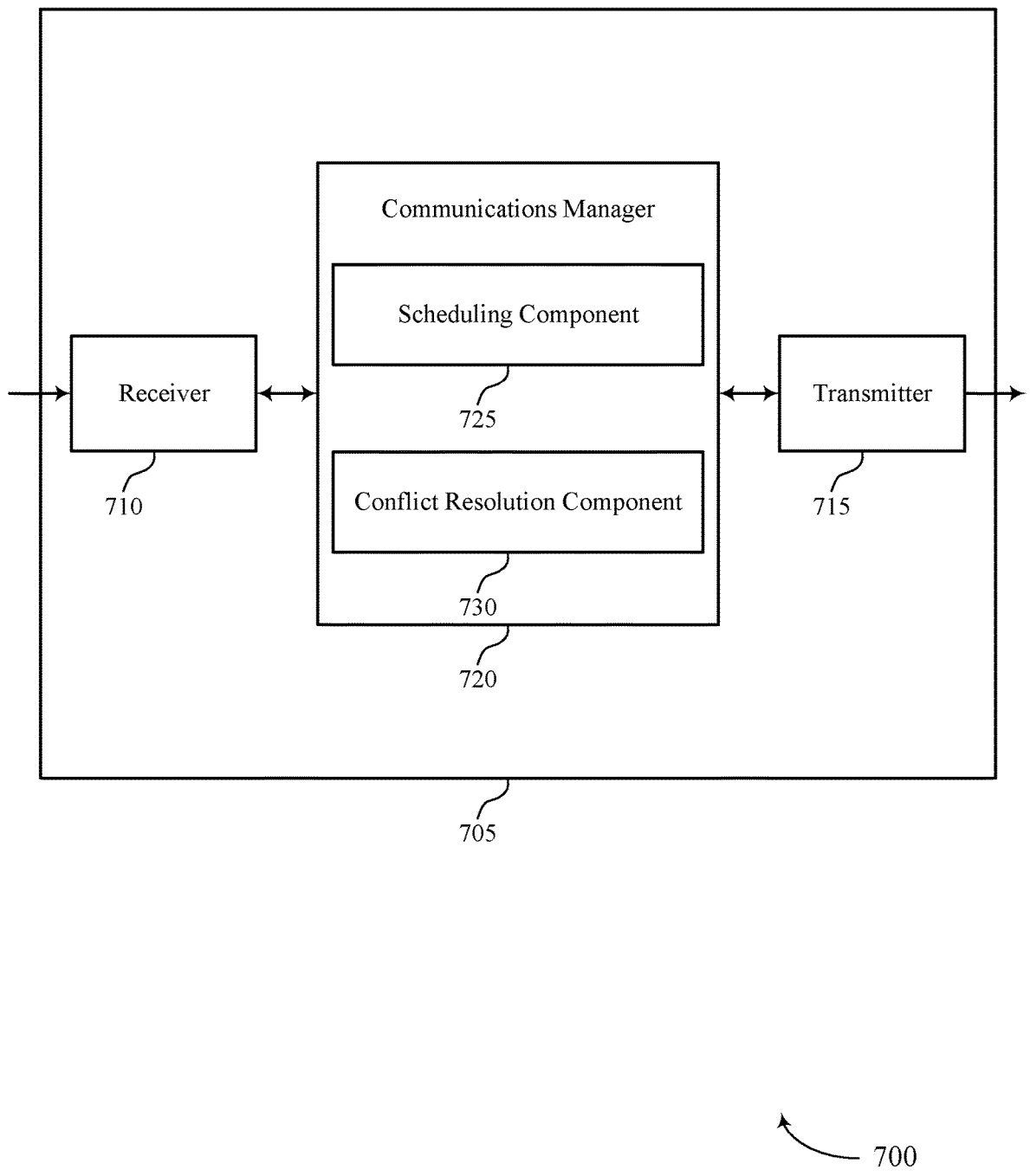

FIG. 7 shows a block diagram 700 of a device 705 that supports priority based conflict resolution in full-duplex operations in accordance with one or more aspects of the present disclosure. The device 705 may be an example of aspects of a device 605, a UE 115, or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to priority based conflict resolution in full-duplex operations). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to priority based conflict resolution in full-duplex operations). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of priority based conflict resolution in full-duplex operations as described herein. For example, the communications manager 720 may include a scheduling component 725 a conflict resolution component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a wireless device in accordance with examples as disclosed herein. The scheduling component 725 may be configured as or otherwise support a means for communicating one or more control messages scheduling a first message associated with a first TCI state and scheduling a second message associated with a second TCI state, where at least a portion of the first message overlaps in time with the second message. The conflict resolution component 730 may be configured as or otherwise support a means for performing a conflict resolution procedure for the first message and the second message based on the first message at least partially overlapping in time with the second message and a conflict between the first TCI state and the second TCI state. The conflict resolution component 730 may be configured as or otherwise support a means for communicating at least the first message based on the conflict resolution procedure.

Figure 8:
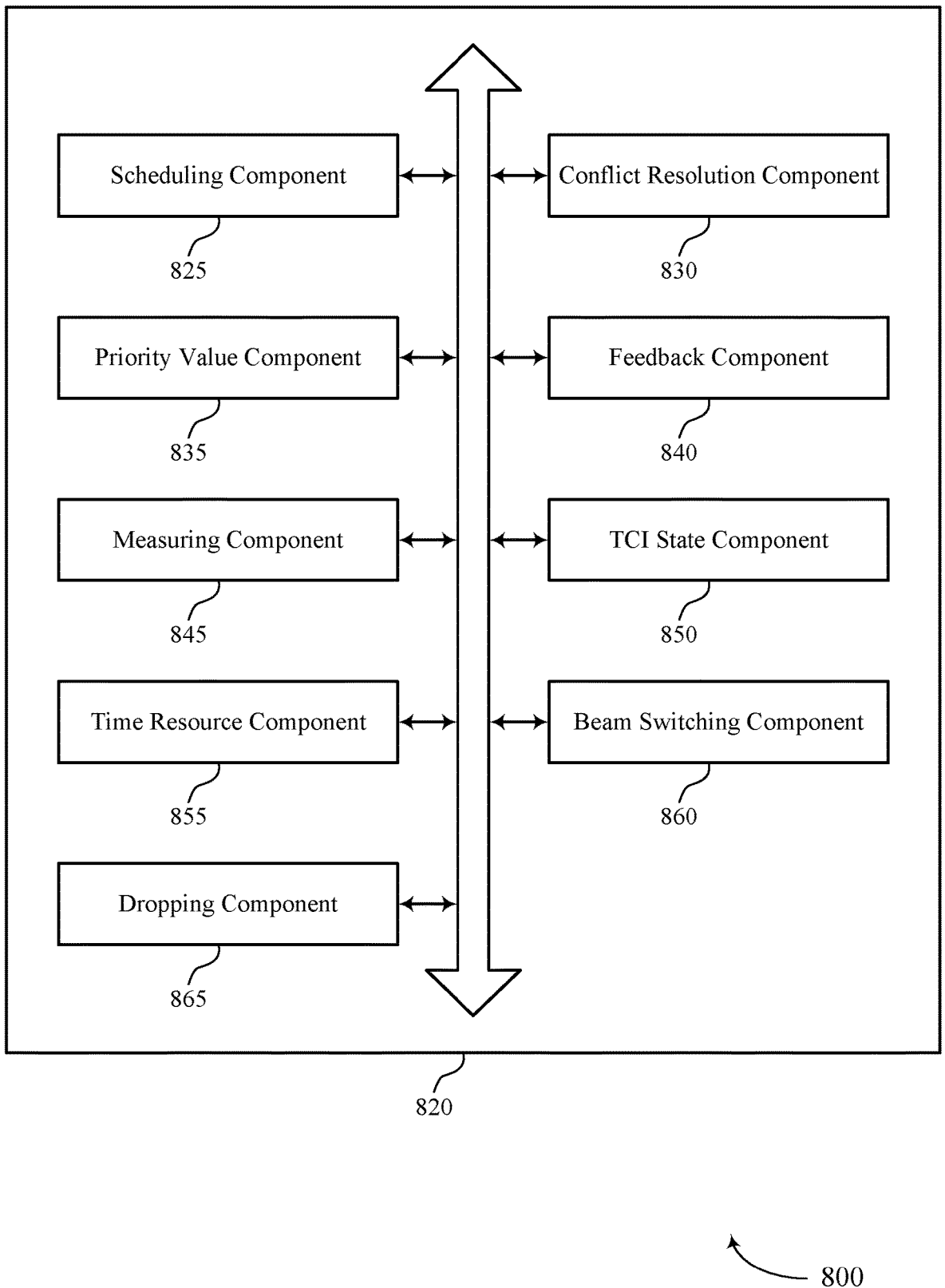
FIG. 8 shows a block diagram of a communications manager that supports priority based conflict resolution in full-duplex operations in accordance with one or more aspects of the present disclosure.

FIG. 8 shows a block diagram 800 of a communications manager 820 that supports priority based conflict resolution in full-duplex operations in accordance with one or more aspects of the present disclosure. The communications manager 820 may be an example of aspects of a communications manager 620, a communications manager 720, or both, as described herein. The communications manager 820, or various components thereof, may be an example of means for performing various aspects of priority based conflict resolution in full-duplex operations as described herein. For example, the communications manager 820 may include a scheduling component 825, a conflict resolution component 830, a priority value component 835, a feedback component 840, a measuring component 845, a TCI state component 850, a time resource component 855, a beam switching component 860, a dropping component 865, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communications at a wireless device in accordance with examples as disclosed herein. The scheduling component 825 may be configured as or otherwise support a means for communicating one or more control messages scheduling a first message associated with a first TCI state and scheduling a second message associated with a second TCI state, where at least a portion of the first message overlaps in time with the second message. The conflict resolution component 830 may be configured as or otherwise support a means for performing a conflict resolution procedure for the first message and the second message based on the first message at least partially overlapping in time with the second message and a conflict between the first TCI state and the second TCI state. In some examples, the conflict resolution component 830 may be configured as or otherwise support a means for communicating at least the first message based on the conflict resolution procedure.

In some examples, to support performing the conflict resolution procedure, the priority value component 835 may be configured as or otherwise support a means for performing the conflict resolution procedure based on a comparison between a first priority value associated with the first message and a second priority value associated with the second message.

In some examples, to support communicating at least the first message, the TCI state component 850 may be configured as or otherwise support a means for transmitting the first message according to the first TCI state.

In some examples, to support communicating at least the first message, the dropping component 865 may be configured as or otherwise support a means for refraining from receiving the second message based on the first priority value being greater than the second priority value.

In some examples, to support communicating at least the first message, the TCI state component 850 may be configured as or otherwise support a means for receiving the first message according to the first TCI state.

In some examples, to support communicating at least the first message, the dropping component 865 may be configured as or otherwise support a means for refraining from transmitting the second message based on the first priority value being greater than the second priority value.

In some examples, the first priority value is greater than the second priority value and, to support communicating at least the first message, the TCI state component 850 may be configured as or otherwise support a means for communicating the first message according to the first TCI state. In some examples, the first priority value is greater than the second priority value and, to support communicating at least the first message, the time resource component 855 may be configured as or otherwise support a means for communicating a portion of the second message according to the second TCI state.

In some examples, to support communicating the first message according to the first TCI state, the TCI state component 850 may be configured as or otherwise support a means for transmitting the first message according to the first TCI state.

In some examples, to support communicating the portion of the second message according to the second TCI state, the time resource component 855 may be configured as or otherwise support a means for receiving the portion of the second message according to the second TCI state.

In some examples, to support communicating the first message according to the first TCI state, the TCI state component 850 may be configured as or otherwise support a means for receiving the first message according to the first TCI state.

In some examples, to support communicating the portion of the second message according to the second TCI state, the time resource component 855 may be configured as or otherwise support a means for transmitting the portion of the second message according to the second TCI state.

In some examples, the first priority value is greater than the second priority value and, to support communicating at least the first message, the TCI state component 850 may be configured as or otherwise support a means for communicating the first message according to the first TCI state. In some examples, the first priority value is greater than the second priority value and, to support communicating at least the first message, the beam switching component 860 may be configured as or otherwise support a means for communicating the second message according to a third TCI state different from the second TCI state.

In some examples, to support communicating the first message according to the first TCI state and communicating the second message according to the third TCI state, the TCI state component 850 may be configured as or otherwise support a means for transmitting the first message according to the first TCI state. In some examples, to support communicating the first message according to the first TCI state and communicating the second message according to the third TCI state, the beam switching component 860 may be configured as or otherwise support a means for receiving the second message according to the third TCI state based on the first priority value being greater than the second priority value.

In some examples, to support communicating the first message according to the first TCI state and communicating the second message according to the third TCI state, the TCI state component 850 may be configured as or otherwise support a means for receiving the first message according to the first TCI state. In some examples, to support communicating the first message according to the first TCI state and communicating the second message according to the third TCI state, the beam switching component 860 may be configured as or otherwise support a means for transmitting the second message according to the third TCI state based on the first priority value being greater than the second priority value.

In some examples, the beam switching component 860 may be configured as or otherwise support a means for selecting the third TCI state based on a first TCI state pair from a set of TCI state pairs, where the first TCI state pair includes the first TCI state and the third TCI state.

In some examples, the measuring component 845 may be configured as or otherwise support a means for performing one or more measurements of one or more pairs of TCI states, where the set of TCI state pairs is based on performing the one or more measurements.

In some examples, the TCI state component 850 may be configured as or otherwise support a means for communicating an indication of the set of TCI state pairs.

In some examples, the set of TCI state pairs is based on one or more parameters at the wireless device.

In some examples, self-interference between the first TCI state and the third TCI state, is less than or equal to a threshold.

In some examples, the feedback component 840 may be configured as or otherwise support a means for communicating a feedback message indicating the conflict resolution procedure, where performing the conflict resolution procedure is based on the feedback message.

In some examples, to support communicating at least the first message, the TCI state component 850 may be configured as or otherwise support a means for communicating the first message according to the first TCI state based on the feedback message.

In some examples, to support communicating at least the first message, the dropping component 865 may be configured as or otherwise support a means for refraining from communicating the second message based on the feedback message.

In some examples, to support communicating at least the first message, the TCI state component 850 may be configured as or otherwise support a means for communicating the first message according to the first TCI state. In some examples, to support communicating at least the first message, the time resource component 855 may be configured as or otherwise support a means for communicating a portion of the second message according to the second TCI state.

In some examples, to support communicating at least the first message, the TCI state component 850 may be configured as or otherwise support a means for communicating the first message according to the first TCI state. In some examples, to support communicating at least the first message, the beam switching component 860 may be configured as or otherwise support a means for communicating the second message according to a third TCI state different from the second TCI state.

In some examples, the measuring component 845 may be configured as or otherwise support a means for measuring self-interference between the first message associated with the first TCI state and the second message associated with a second TCI state, where the conflict is based on the self-interference for full-duplex operation being greater than a threshold.

In some examples, the wireless device is a UE and, to support communicating the one or more control messages, the scheduling component 825 may be configured as or otherwise support a means for receiving the one or more control messages scheduling the first message associated with the first TCI state and scheduling the second message associated with the second TCI state.

In some examples, the wireless device is a network entity and, to support communicating the one or more control messages, the scheduling component 825 may be configured as or otherwise support a means for transmitting the one or more control messages scheduling the first message associated with the first TCI state and scheduling the second message associated with the second TCI state.

In some examples, the first message is a periodic transmission or an aperiodic transmission and the second message is a periodic transmission or an aperiodic transmission.

In some examples, the first message is a downlink transmission and the second message is an uplink transmission or the first message is an uplink transmission and the second message is a downlink transmission.

Figure 9:
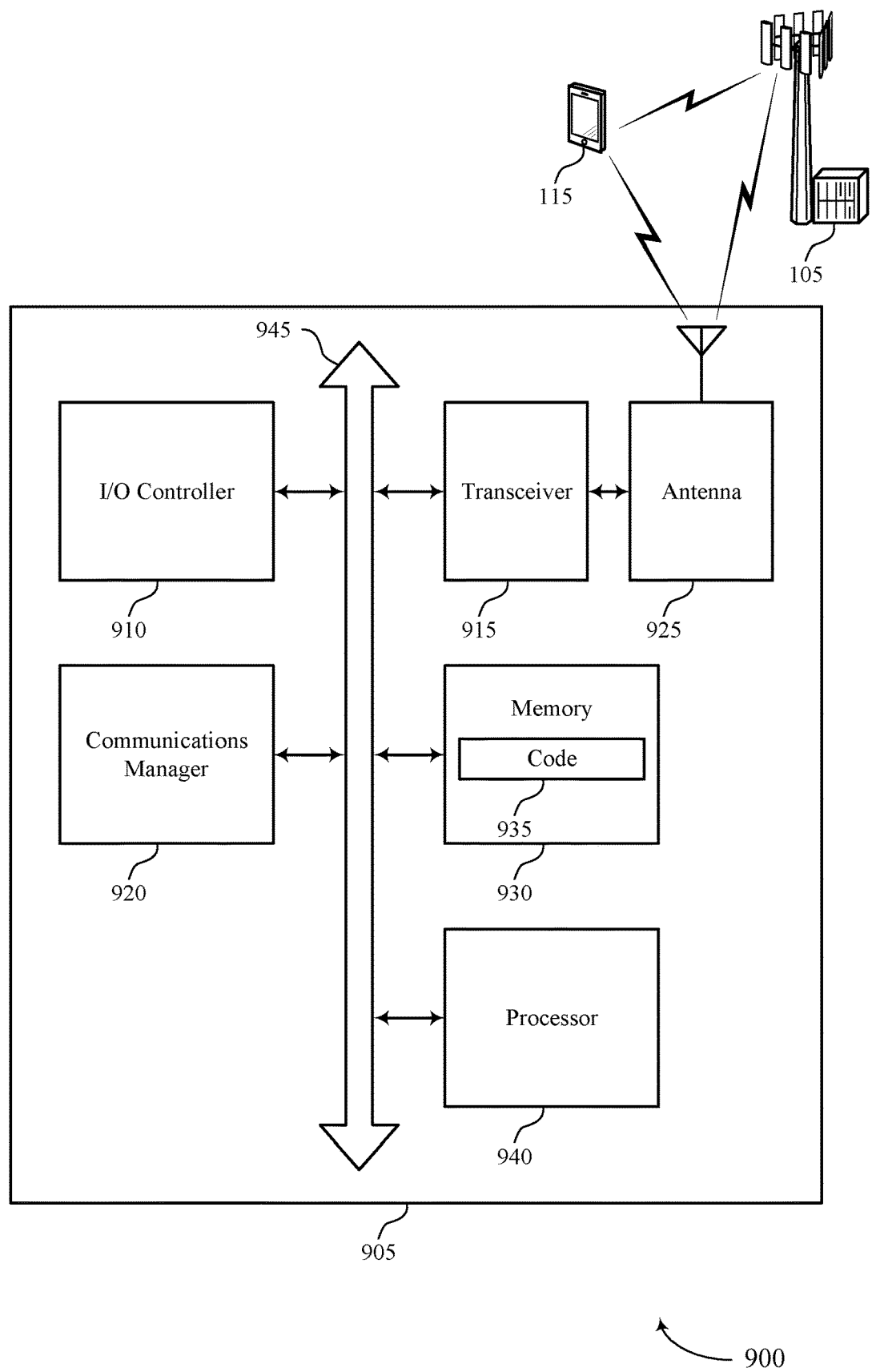
FIG. 9 shows a diagram of a system including a UE that supports priority based conflict resolution in full-duplex operations in accordance with one or more aspects of the present disclosure.

FIG. 9 shows a diagram of a system 900 including a device 905 that supports priority based conflict resolution in full-duplex operations in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting priority based conflict resolution in full-duplex operations). For example, the device 905 or a component of the device 905 may include a processor 940 and memory 930 coupled with or to the processor 940, the processor 940 and memory 930 configured to perform various functions described herein.

The communications manager 920 may support wireless communications at a wireless device in accordance with examples as disclosed herein. For example, the communications manager 920 may be configured as or otherwise support a means for communicating one or more control messages scheduling a first message associated with a first TCI state and scheduling a second message associated with a second TCI state, where at least a portion of the first message overlaps in time with the second message. The communications manager 920 may be configured as or otherwise support a means for performing a conflict resolution procedure for the first message and the second message based on the first message at least partially overlapping in time with the second message and a conflict between the first TCI state and the second TCI state. The communications manager 920 may be configured as or otherwise support a means for communicating at least the first message based on the conflict resolution procedure.

By including or configuring the communications manager 920 in accordance with examples as described herein, the device 905 may support techniques for priority based conflict resolution which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of priority based conflict resolution in full-duplex operations as described herein, or the processor 940 and the memory 930 may be otherwise configured to perform or support such operations.

Figure 10:
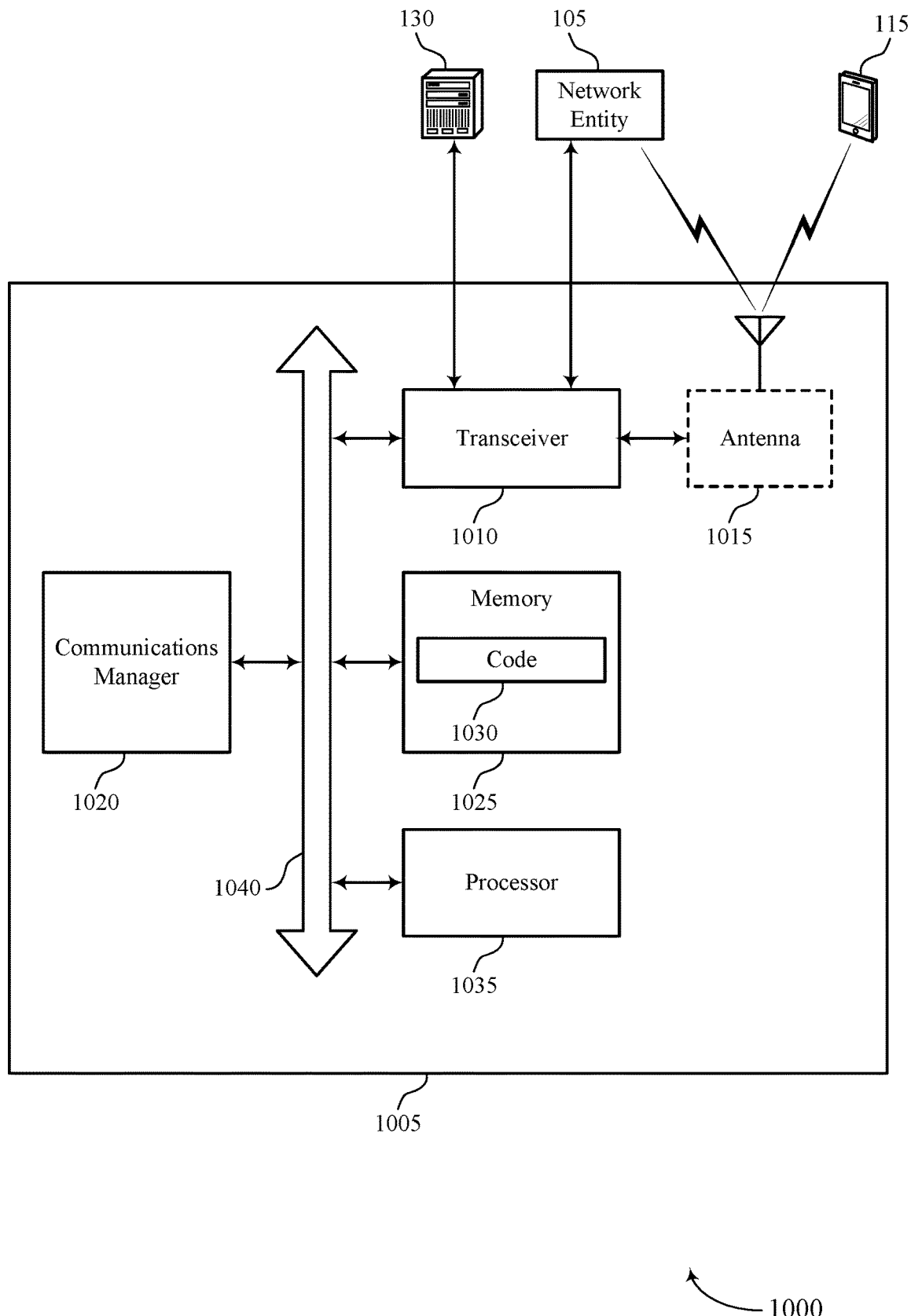
FIG. 10 shows a diagram of a system including a network entity that supports priority based conflict resolution in full-duplex operations in accordance with one or more aspects of the present disclosure.

FIG. 10 shows a diagram of a system 1000 including a device 1005 that supports priority based conflict resolution in full-duplex operations in accordance with one or more aspects of the present disclosure. The device 1005 may be an example of or include the components of a device 605, a device 705, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. The transceiver 1010, or the transceiver 1010 and one or more antennas 1015 or wired interfaces, where applicable, may be an example of a transmitter 615, a transmitter 715, a receiver 610, a receiver 710, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1025 may include RAM and ROM. The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a BIOS which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting priority based conflict resolution in full-duplex operations). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105, and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communications at a wireless device in accordance with examples as disclosed herein. For example, the communications manager 1020 may be configured as or otherwise support a means for communicating one or more control messages scheduling a first message associated with a first TCI state and scheduling a second message associated with a second TCI state, where at least a portion of the first message overlaps in time with the second message. The communications manager 1020 may be configured as or otherwise support a means for performing a conflict resolution procedure for the first message and the second message based on the first message at least partially overlapping in time with the second message and a conflict between the first TCI state and the second TCI state. The communications manager 1020 may be configured as or otherwise support a means for communicating at least the first message based on the conflict resolution procedure.

By including or configuring the communications manager 1020 in accordance with examples as described herein, the device 1005 may support techniques for priority based conflict resolution which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the processor 1035, the memory 1025, the code 1030, the transceiver 1010, or any combination thereof. For example, the code 1030 may include instructions executable by the processor 1035 to cause the device 1005 to perform various aspects of priority based conflict resolution in full-duplex operations as described herein, or the processor 1035 and the memory 1025 may be otherwise configured to perform or support such operations.

Figure 11:
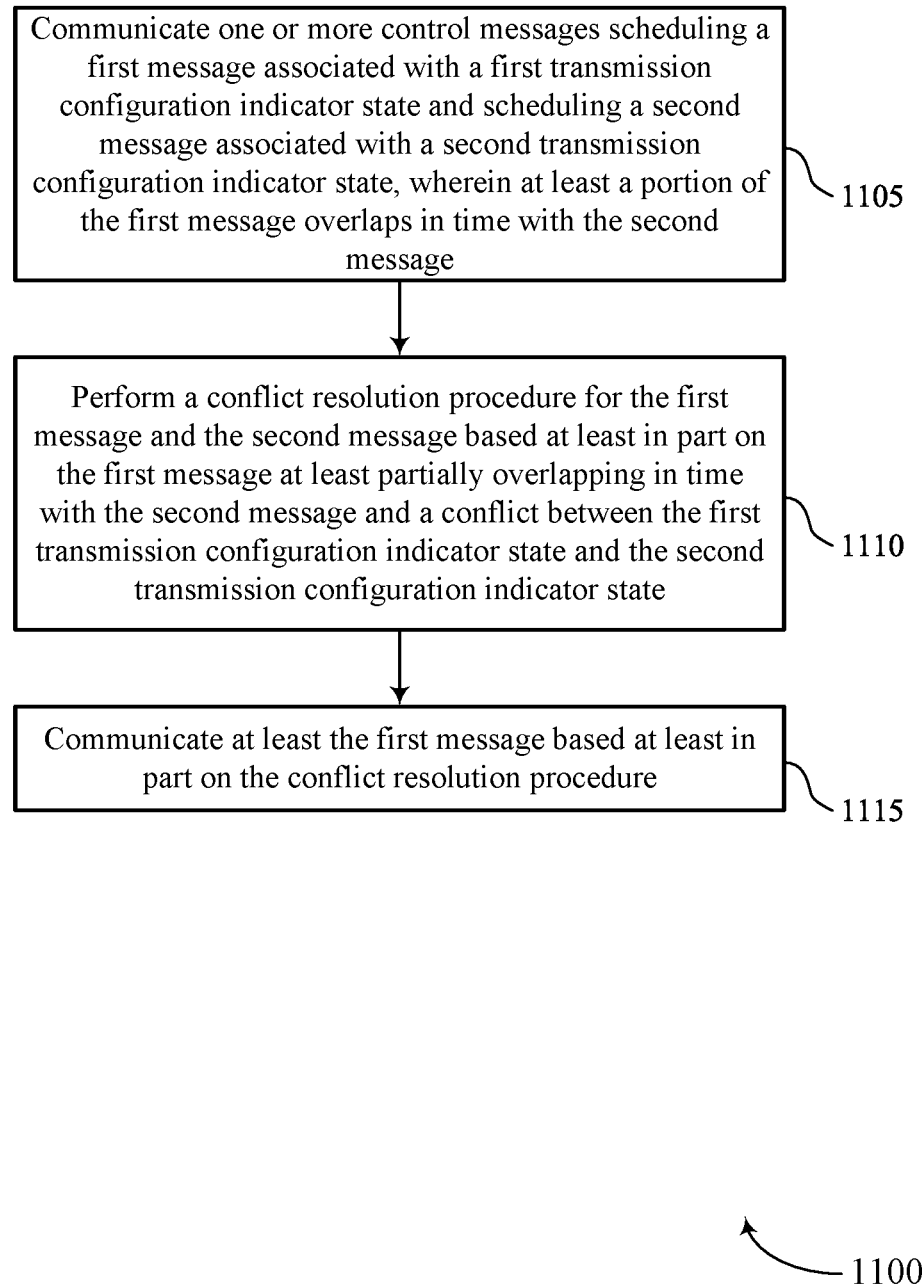
FIGS. 11 and 12 show flowcharts illustrating methods that support priority based conflict resolution in full-duplex operations in accordance with one or more aspects of the present disclosure.

FIG. 11 shows a flowchart illustrating a method 1100 that supports priority based conflict resolution in full-duplex operations in accordance with one or more aspects of the present disclosure. The operations of the method 1100 may be implemented by or its components as described herein. For example, the operations of the method 1100 may be performed by. In some examples, may execute a set of instructions to control the functional elements of to perform the described functions. Additionally, or alternatively, may perform aspects of the described functions using special-purpose hardware.

At 1105, the method may include communicating one or more control messages scheduling a first message associated with a first TCI state and scheduling a second message associated with a second TCI state, where at least a portion of the first message overlaps in time with the second message. The operations of 1105 may be performed in accordance with examples as disclosed herein.

At 1110, the method may include performing a conflict resolution procedure for the first message and the second message based on the first message at least partially overlapping in time with the second message and a conflict between the first TCI state and the second TCI state. The operations of 1110 may be performed in accordance with examples as disclosed herein.

At 1115, the method may include communicating at least the first message based on the conflict resolution procedure. The operations of 1115 may be performed in accordance with examples as disclosed herein.

Figure 12:
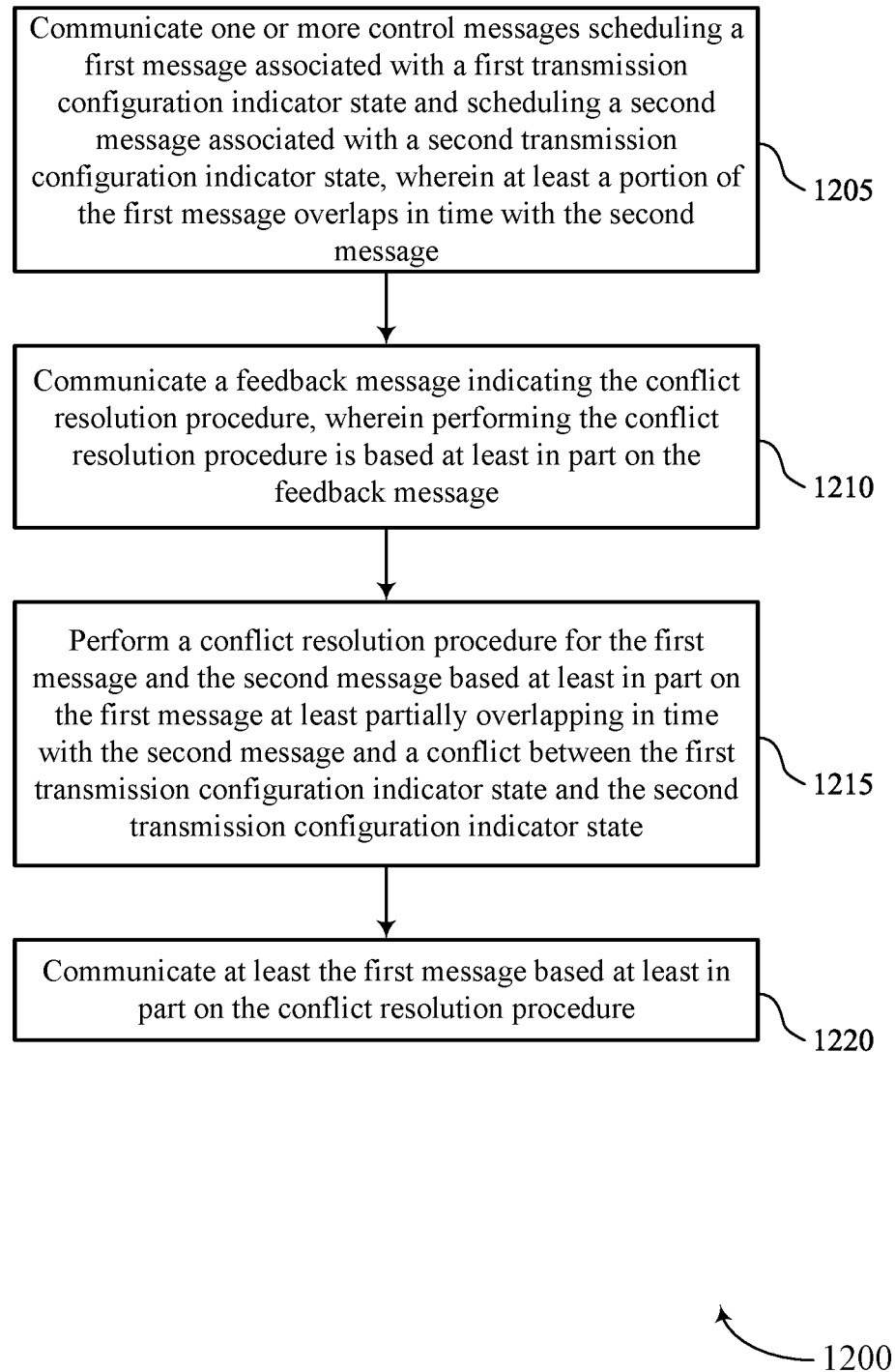

FIG. 12 shows a flowchart illustrating a method 1200 that supports priority based conflict resolution in full-duplex operations in accordance with one or more aspects of the present disclosure. The operations of the method 1200 may be implemented by or its components as described herein. For example, the operations of the method 1200 may be performed by. In some examples, may execute a set of instructions to control the functional elements of to perform the described functions. Additionally, or alternatively, may perform aspects of the described functions using special-purpose hardware.

At 1205, the method may include communicating one or more control messages scheduling a first message associated with a first TCI state and scheduling a second message associated with a second TCI state, where at least a portion of the first message overlaps in time with the second message. The operations of 1205 may be performed in accordance with examples as disclosed herein.

At 1210, the method may include communicating a feedback message indicating the conflict resolution procedure, where performing the conflict resolution procedure is based on the feedback message. The operations of 1210 may be performed in accordance with examples as disclosed herein.

At 1215, the method may include performing a conflict resolution procedure for the first message and the second message based on the first message at least partially overlapping in time with the second message and a conflict between the first TCI state and the second TCI state. The operations of 1215 may be performed in accordance with examples as disclosed herein.

At 1220, the method may include communicating at least the first message based on the conflict resolution procedure. The operations of 1220 may be performed in accordance with examples as disclosed herein.

The following provides an overview of aspects of the present disclosure:

Aspect 1: A method for wireless communications at a wireless device, comprising: communicating one or more control messages scheduling a first message associated with a first TCI state and scheduling a second message associated with a second TCI state, wherein at least a portion of the first message overlaps in time with the second message; performing a conflict resolution procedure for the first message and the second message based at least in part on the first message at least partially overlapping in time with the second message and a conflict between the first TCI state and the second TCI state; and communicating at least the first message based at least in part on the conflict resolution procedure.

Aspect 2: The method of aspect 1, wherein performing the conflict resolution procedure comprises: performing the conflict resolution procedure based at least in part on a comparison between a first priority value associated with the first message and a second priority value associated with the second message.

Aspect 3: The method of aspect 2, wherein the first priority value is greater than the second priority value, and wherein communicating at least the first message comprises: transmitting the first message according to the first TCI state.

Aspect 4: The method of aspect 3, wherein the first priority value is greater than the second priority value, and wherein communicating at least the first message further comprises: refraining from receiving the second message based at least in part on the first priority value being greater than the second priority value.

Aspect 5: The method of aspect 2, wherein the first priority value is greater than the second priority value, and wherein communicating at least the first message comprises: receiving the first message according to the first TCI state.

Aspect 6: The method of aspect 5, wherein the first priority value is greater than the second priority value, and wherein communicating at least the first message further comprises: refraining from transmitting the second message based at least in part on the first priority value being greater than the second priority value.

Aspect 7: The method of aspect 2, wherein the first priority value is greater than the second priority value and communicating at least the first message comprises: communicating the first message according to the first TCI state; and communicating a portion of the second message according to the second TCI state.

Aspect 8: The method of aspect 7, wherein communicating the first message according to the first TCI state comprises: transmitting the first message according to the first TCI state.

Aspect 9: The method of aspect 8, wherein communicating the portion of the second message according to the second TCI state comprises: receiving the portion of the second message according to the second TCI state.

Aspect 10: The method of aspect 7, wherein communicating the first message according to the first TCI state comprises: receiving the first message according to the first TCI state.

Aspect 11: The method of aspect 10, wherein communicating the portion of the second message according to the second TCI state comprises: transmitting the portion of the second message according to the second TCI state.

Aspect 12: The method of aspect 2, wherein the first priority value is greater than the second priority value and communicating at least the first message comprises: communicating the first message according to the first TCI state; and communicating the second message according to a third TCI state different from the second TCI state.

Aspect 13: The method of aspect 12, wherein communicating the first message according to the first TCI state and communicating the second message according to the third TCI state comprises: transmitting the first message according to the first TCI state; and receiving the second message according to the third TCI state based at least in part on the first priority value being greater than the second priority value.

Aspect 14: The method of aspect 12, wherein communicating the first message according to the first TCI state and communicating the second message according to the third TCI state comprises: receiving the first message according to the first TCI state; and transmitting the second message according to the third TCI state based at least in part on the first priority value being greater than the second priority value.

Aspect 15: The method of any of aspects 12 through 14, further comprising: selecting the third TCI state based at least in part on a first TCI state pair from a set of TCI state pairs, wherein the first TCI state pair comprises the first TCI state and the third TCI state.

Aspect 16: The method of aspect 15, further comprising: performing one or more measurements of one or more pairs of TCI states, wherein the set of TCI state pairs is based at least in part on performing the one or more measurements.

Aspect 17: The method of aspect 16, further comprising: communicating an indication of the set of TCI state pairs.

Aspect 18: The method of aspect 15, wherein the set of TCI state pairs is based at least in part on one or more parameters at the wireless device.

Aspect 19: The method of any of aspects 12 through 18, wherein self-interference between the first TCI state and the third TCI state, is less than or equal to a threshold.

Aspect 20: The method of any of aspects 1 through 19, further comprising: communicating a feedback message indicating the conflict resolution procedure, wherein performing the conflict resolution procedure is based at least in part on the feedback message.

Aspect 21: The method of aspect 20, wherein communicating at least the first message comprises: communicating the first message according to the first TCI state based at least in part on the feedback message.

Aspect 22: The method of aspect 21, wherein communicating at least the first message further comprises: refraining from communicating the second message based at least in part on the feedback message.

Aspect 23: The method of aspect 20, wherein communicating at least the first message comprises: communicating the first message according to the first TCI state; and communicating a portion of the second message according to the second TCI state.

Aspect 24: The method of any of aspects 20, wherein communicating at least the first message comprises: communicating the first message according to the first TCI state; and communicating the second message according to a third TCI state different from the second TCI state.

Aspect 25: The method of any of aspects 1 through 24, further comprising: measuring self-interference between the first message associated with the first TCI state and the second message associated with a second TCI state, wherein the conflict is based at least in part on the self-interference for full-duplex operation being greater than a threshold.

Aspect 26: The method of any of aspects 1 through 25, wherein the wireless device is a UE and communicating the one or more control messages comprises: receiving the one or more control messages scheduling the first message associated with the first TCI state and scheduling the second message associated with the second TCI state.

Aspect 27: The method of any of aspects 1 through 25, wherein the wireless device is a network entity and communicating the one or more control messages comprises: transmitting the one or more control messages scheduling the first message associated with the first TCI state and scheduling the second message associated with the second TCI state.

Aspect 28: An apparatus for wireless communications at a wireless device, comprising a processor; memory coupled with the processor; and instructions stored in the memory and executable by the processor to cause the apparatus to perform a method of any of aspects 1 through 27.

Aspect 29: An apparatus for wireless communications at a wireless device, comprising at least one means for performing a method of any of aspects 1 through 27.

Aspect 30: A non-transitory computer-readable medium storing code for wireless communications at a wireless device, the code comprising instructions executable by a processor to perform a method of any of aspects 1 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a wireless device, comprising:
   communicating one or more control messages scheduling a downlink message associated with a first transmission configuration indicator state and scheduling an uplink message associated with a second transmission configuration indicator state, wherein at least a portion of the downlink message overlaps in time with the uplink message;
   performing a conflict resolution procedure for the downlink message and the uplink message based at least in part on the downlink message at least partially overlapping in time with the uplink message and a conflict between the first transmission configuration indicator state and the second transmission configuration indicator state; and
   communicating at least one of the downlink message or the uplink message based at least in part on the conflict resolution procedure.

2. The method of claim 1, wherein performing the conflict resolution procedure comprises:
   performing the conflict resolution procedure based at least in part on a comparison between a first priority value associated with the downlink message and a second priority value associated with the uplink message.

3. The method of claim 2, wherein the first priority value is less than the second priority value, and wherein communicating at least one of the downlink message or the uplink message comprises:
   communicating the uplink message according to the second transmission configuration indicator state.

4. The method of claim 3, wherein the first priority value is less than the second priority value, and wherein communicating at least one of the downlink message or the uplink message further comprises:
   refraining from communicating the downlink message based at least in part on the first priority value being greater than the second priority value.

5. The method of claim 2, wherein the first priority value is greater than the second priority value, and wherein communicating at least one of the downlink message or the uplink message comprises:
   communicating the downlink message according to the first transmission configuration indicator state.

6. The method of claim 5, wherein the first priority value is greater than the second priority value, and wherein communicating at least one of the downlink message or the uplink message further comprises:
   refraining from communicating the uplink message based at least in part on the first priority value being greater than the second priority value.

7. The method of claim 2, wherein the first priority value is greater than the second priority value and communicating at least one of the downlink message or the uplink message comprises:
   communicating the downlink message according to the first transmission configuration indicator state; and
   communicating a portion of the uplink message according to the second transmission configuration indicator state.

8. The method of claim 2, wherein the first priority value is less than the second priority value, and wherein communicating at least one of the downlink message or the uplink message comprises:
   communicating the uplink message according to the second transmission configuration indicator state; and
   communicating a portion of the downlink message according to the first transmission configuration indicator state.

9. The method of claim 2, wherein the first priority value is greater than the second priority value and communicating at least one of the downlink message or the uplink message comprises:
   communicating the downlink first message according to the first transmission configuration indicator state; and
   communicating the uplink second message according to a third transmission configuration indicator state different from the second transmission configuration indicator state based at least in part on the first priority value being greater than the second priority value.

10. The method of claim 2, wherein the first priority value is less than the second priority value, and wherein communicating at least one of the downlink message or the uplink message comprises:
    communicating the uplink message according to the second transmission configuration indicator state; and
    communicating the downlink message according to a third transmission configuration indicator state based at least in part on the first priority value being less than the second priority value.

11. The method of claim 10, further comprising:
    selecting the third transmission configuration indicator state based at least in part on a first transmission configuration indicator state pair from a set of transmission configuration indicator state pairs, wherein the first transmission configuration indicator state pair comprises the second transmission configuration indicator state and the third transmission configuration indicator state.

12. The method of claim 11, further comprising:
    performing one or more measurements of one or more pairs of transmission configuration indicator states, wherein the set of transmission configuration indicator state pairs is based at least in part on performing the one or more measurements.

13. The method of claim 12, further comprising:
communicating an indication of the set of transmission configuration indicator state pairs.

14. The method of claim 11, wherein the set of transmission configuration indicator state pairs is based at least in part on one or more parameters at the wireless device.

15. The method of claim 9, wherein self-interference between the second transmission configuration indicator state and the third transmission configuration indicator state, is less than or equal to a threshold.

16. The method of claim 1, further comprising:
communicating a feedback message indicating the conflict resolution procedure, wherein performing the conflict resolution procedure is based at least in part on the feedback message.

17. The method of claim 16, wherein communicating at least one of the downlink message or the uplink message comprises:
communicating one of the downlink message or the uplink message based at least in part on the feedback message.

18. The method of claim 1, further comprising:
measuring self-interference between the downlink message associated with the first transmission configuration indicator state and the uplink message associated with a second transmission configuration indicator state, wherein the conflict is based at least in part on the self-interference for full-duplex operation being greater than a threshold.

19. The method of claim 1, wherein the wireless device is a user equipment (UE) and communicating the one or more control messages comprises:
receiving the one or more control messages scheduling the downlink message associated with the first transmission configuration indicator state and scheduling the uplink message associated with the second transmission configuration indicator state.

20. The method of claim 1, wherein the wireless device is a network entity and communicating the one or more control messages comprises:
transmitting the one or more control messages scheduling the downlink message associated with the first transmission configuration indicator state and scheduling the uplink message associated with the second transmission configuration indicator state.

21. The method of claim 9, further comprising:
selecting the third transmission configuration indicator state based at least in part on a first transmission configuration indicator state pair from a set of transmission configuration indicator state pairs, wherein the first transmission configuration indicator state pair comprises the first transmission configuration indicator state and the third transmission configuration indicator state.

22. The method of claim 21, further comprising:
performing one or more measurements of one or more pairs of transmission configuration indicator states, wherein the set of transmission configuration indicator state pairs is based at least in part on performing the one or more measurements.

23. The method of claim 22, further comprising:
communicating an indication of the set of transmission configuration indicator state pairs.

24. The method of claim 21, wherein the set of transmission configuration indicator state pairs is based at least in part on one or more parameters at the wireless device.

25. An apparatus for wireless communications at a wireless device, comprising:
a processor;
memory coupled with the processor; and
instructions stored in the memory and executable by the processor to cause the apparatus to:
communicate one or more control messages scheduling a downlink message associated with a first transmission configuration indicator state and scheduling an uplink message associated with a second transmission configuration indicator state, wherein at least a portion of the downlink message overlaps in time with the uplink message;
perform a conflict resolution procedure for the downlink message and the uplink message based at least in part on the downlink message at least partially overlapping in time with the uplink message and a conflict between the first transmission configuration indicator state and the second transmission configuration indicator state; and
communicate at least one of the downlink message or the uplink message based at least in part on the conflict resolution procedure.

26. An apparatus for wireless communications at a wireless device, comprising:
means for communicating one or more control messages scheduling a downlink message associated with a first transmission configuration indicator state and scheduling an uplink message associated with a second transmission configuration indicator state, wherein at least a portion of the downlink message overlaps in time with the uplink message;
means for performing a conflict resolution procedure for the downlink message and the uplink message based at least in part on the downlink message at least partially overlapping in time with the uplink message and a conflict between the first transmission configuration indicator state and the second transmission configuration indicator state; and
means for communicating at least one of the downlink message or the uplink message based at least in part on the conflict resolution procedure.

27. A non-transitory computer-readable medium storing code for wireless communications at a wireless device, the code comprising instructions executable by a processor to:
communicate one or more control messages scheduling a downlink message associated with a first transmission configuration indicator state and scheduling an uplink message associated with a second transmission configuration indicator state, wherein at least a portion of the downlink message overlaps in time with the uplink message;
perform a conflict resolution procedure for the downlink message and the uplink message based at least in part on the downlink message at least partially overlapping in time with the uplink message and a conflict between the first transmission configuration indicator state and the second transmission configuration indicator state; and
communicate at least one of the downlink message or the uplink message based at least in part on the conflict resolution procedure.

* * * * *